US012633187B2

(12) United States Patent
Nada

(10) Patent No.: US 12,633,187 B2
(45) Date of Patent: May 19, 2026

(54) PAPER SHEET PROCESSING DEVICE

(71) Applicant: Glory Ltd., Himeji (JP)

(72) Inventor: Keisuke Nada, Himeji (JP)

(73) Assignee: GLORY LTD., Himeji (JP)

( * ) Notice: Subject to any disclaimer, the term of this patent is extended or adjusted under 35 U.S.C. 154(b) by 1095 days.

(21) Appl. No.: 17/699,177

(22) Filed: Mar. 21, 2022

(65) Prior Publication Data

US 2022/0207951 A1 Jun. 30, 2022

Related U.S. Application Data

(63) Continuation of application No. PCT/JP2020/033624, filed on Sep. 4, 2020.

(30) Foreign Application Priority Data

Sep. 30, 2019 (JP) ................................ 2019-178813

(51) Int. Cl.
*G07D 11/24* (2019.01)
*B65H 7/02* (2006.01)
(Continued)

(52) U.S. Cl.
CPC ............... *G07D 11/24* (2019.01); *B65H 7/02* (2013.01); *B65H 29/006* (2013.01); *B65H 31/24* (2013.01);
(Continued)

(58) Field of Classification Search
CPC .......... G07D 11/24; G07D 7/00; G07D 11/36; G07D 2211/00; G07D 11/245; G07D 11/25; G07D 11/34; G07D 11/12; B65H 7/02; B65H 29/006; B65H 31/24; B65H 2701/1912
See application file for complete search history.

(56) References Cited

U.S. PATENT DOCUMENTS

2013/0001040 A1* 1/2013 Iwamura ................ G07D 11/30 194/206
2013/0041809 A1* 2/2013 Ino ........................... G07C 9/38 109/23
2020/0134957 A1* 4/2020 Yokawa .................... E05G 1/06

FOREIGN PATENT DOCUMENTS

JP 2004-62705 A 2/2004
JP 2007-156710 A 6/2007
(Continued)

OTHER PUBLICATIONS

International Search Report and Written Opinion mailed on Nov. 2, 2020, received for PCT Application PCT/JP2020/033624, Filed on Sep. 4, 2020, 9 pages including English Translation.

*Primary Examiner* — Jeffrey A Shapiro
(74) *Attorney, Agent, or Firm* — XSENSUS LLP

(57) ABSTRACT

A sheet handling device includes: a first storage; a second storage that stores a sheet in a different storage manner from the first storage; a transport unit that transports the sheet; and a processing circuitry that manages the sheet. When the processing circuitry determines that the sheet handling device satisfies a first condition, the processing circuitry switches a mode from a first mode to a second mode to manage the sheet related to the first storage. When the processing circuitry determines that the sheet handling device satisfies a second condition, the processing circuitry switches the mode from the first mode to the second mode to manage the sheet related to the second storage.

10 Claims, 10 Drawing Sheets

(51) Int. Cl.

| | |
|---|---|
| ***B65H 29/00*** | (2006.01) |
| ***B65H 31/24*** | (2006.01) |
| ***G07D 7/00*** | (2016.01) |
| ***G07D 11/36*** | (2019.01) |

(52) U.S. Cl.

CPC ............... *G07D 7/00* (2013.01); *G07D 11/36* (2019.01); *B65H 2701/1912* (2013.01); *G07D 2211/00* (2013.01)

(56) References Cited

FOREIGN PATENT DOCUMENTS

| | | | | | |
|---|---|---|---|---|---|
| JP | 2012-27661 | A | | 2/2012 | |
| JP | 2013-12127 | A | | 1/2013 | |
| JP | 2014-085783 | A | | 5/2014 | |
| JP | 2015-22615 | A | | 2/2015 | |
| JP | 2015-156141 | A | | 8/2015 | |
| WO | WO 2018/168465 | A1 | * | 9/2018 | ............. G07D 11/40 |

* cited by examiner

FIG.9

P91

INITIAL

| | FIRST TAPE STORAGE UNIT | SECOND TAPE STORAGE UNIT | FIRST STACK STORAGE UNIT | SECOND STACK STORAGE UNIT | REJECT STORAGE UNIT | TOTAL | NUMBER OF DEPOSITED BANKNOTES |
|---|---|---|---|---|---|---|---|
| COUNTER | 100 | 100 | 200 | 200 | 50 | 450 | – |
| ACTUAL | 100 | 100 | 199 | 202 | 49 | 450 | – |

⇩

P92

ERROR DURING DEPOSIT PROCESS

| | FIRST TAPE STORAGE UNIT | SECOND TAPE STORAGE UNIT | FIRST STACK STORAGE UNIT | SECOND STACK STORAGE UNIT | REJECT STORAGE UNIT | TOTAL | NUMBER OF DEPOSITED BANKNOTES |
|---|---|---|---|---|---|---|---|
| COUNTER | 110 (+10) | 100 | 210 (+10) | 200 | 50 | 460 (+10) | 20 |
| ACTUAL | 109 (+9) | 100 | 211 (+12) | 202 | 49 | 462 (+12) | 21 |

⇩

P93

RECONCILIATION PROCESS PERFORMED ON TAPE STORAGE UNIT, AND NO RECONCILIATION PROCESS PERFORMED ON STACK STORAGE UNITS

| | FIRST TAPE STORAGE UNIT | SECOND TAPE STORAGE UNIT | FIRST STACK STORAGE UNIT | SECOND STACK STORAGE UNIT | REJECT STORAGE UNIT | TOTAL | NUMBER OF DEPOSITED BANKNOTES |
|---|---|---|---|---|---|---|---|
| COUNTER | 109 (−1) | 100 | 210 | 200 | 50 | 460 | 19 |
| ACTUAL | 109 (+9) | 100 | 211 | 202 | 49 | 462 | 21 |

⇩

P94

RECONCILIATION PROCESS PERFORMED ON STACK STORAGE UNITS

| | FIRST TAPE STORAGE UNIT | SECOND TAPE STORAGE UNIT | FIRST STACK STORAGE UNIT | SECOND STACK STORAGE UNIT | REJECT STORAGE UNIT | TOTAL | NUMBER OF DEPOSITED BANKNOTES |
|---|---|---|---|---|---|---|---|
| COUNTER | 109 (−1) | 100 | 210 (+1) | 202 (+2) | 49 (−1) | 462 (+2) | 21 |
| ACTUAL | 109 (+9) | 100 | 211 | 202 | 49 | 462 | 21 |

PAPER SHEET PROCESSING DEVICE

CROSS-REFERENCE TO RELATED APPLICATIONS

This application is a bypass continuation of International Patent Cooperation Treaty Application No. PCT/JP2020/033624 filed on Sep. 4, 2020, and to Japanese Patent Application No. 2019-178813 filed on Sep. 30, 2019, the entire disclosures of each of which are incorporated herein by reference.

BACKGROUND

Conventionally, a banknote handling device includes a plurality of storage units. The plurality of storage units stores banknotes by denomination. The banknote handling device manages the number of banknotes stored therein based on the number of banknotes fed into the device and the number of banknotes fed out of the device. When the number of banknotes stored in any storage unit becomes uncertain, this banknote handling device performs a reconciliation process on all the storage units.

Another conventional banknote handling device identifies the storage unit when the number of banknotes stored in any of the storage units becomes uncertain, and performs a reconciliation process only on that storage unit.

SUMMARY

The technique disclosed herein relates to a sheet handling device that handles a sheet. The sheet handling device includes: a storage unit including a first storage unit that stores the sheet, and a second storage unit that stores the sheet in a different storage manner from the first storage unit; a transport unit that transports the sheet inside the sheet handling device; and a control unit that manages the sheet stored in the first storage unit and the second storage unit. When the control unit determines that the sheet handling device satisfies a first condition, the control unit switches a mode from a first mode to a second mode to manage the sheet related to the first storage unit. When the control unit determines that the sheet handling device satisfies a second condition different from the first condition, the control unit switches the mode from the first mode to the second mode to manage the sheet related to the second storage unit.

BRIEF DESCRIPTION OF THE DRAWINGS

FIG. 9 is a transition diagram illustrating a control example for management of banknotes in a quantity management mode.

DETAILED DESCRIPTION OF THE DRAWINGS

Figure 1:
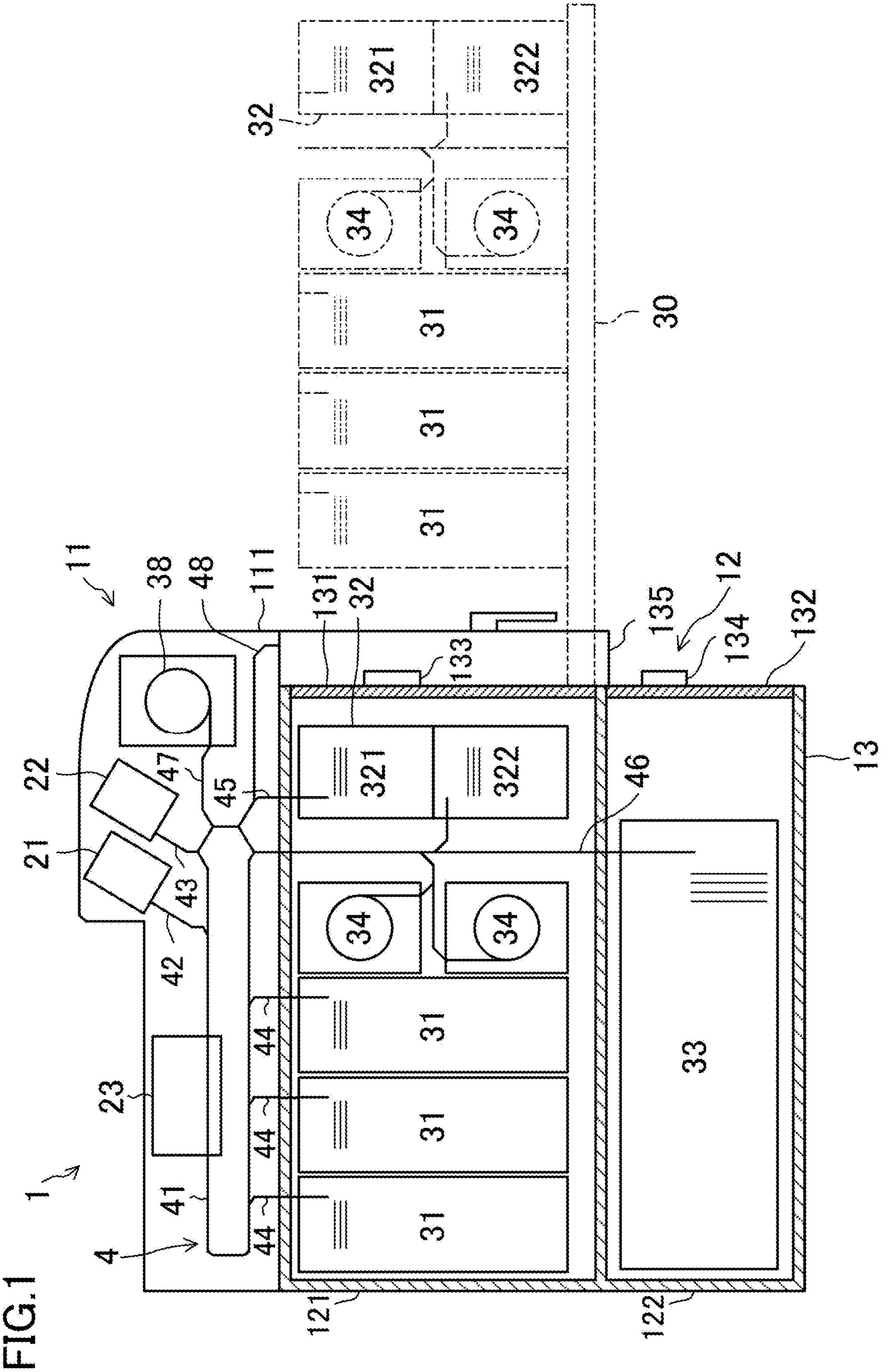
FIG. 1 illustrates an internal configuration of a banknote handling device.

If the reconciliation process is performed on all the storage units when the number of banknotes stored in any of the storage units becomes uncertain, the time required for the reconciliation process is increased, and the use of the banknote handling device is unnecessarily limited.

In, for example, a banknote handling device including a plurality of storage units, if the management mode of all the storage units is switched based on the same specific condition regardless of the necessity for the reconciliation process, the functions of the banknote handling device may be unnecessarily limited.

This will be described using a specific example. It is herein assumed that the banknote handling device manages the banknotes stored in each storage unit based on the serial numbers read from the banknotes. By identifying and managing the individual banknotes based on the serial numbers, the banknote handling device can manage the order of banknotes stored in each storage unit. This allows the banknote handling device to have various functions.

Alternatively, the banknote handling device can also manage the banknotes stored in each storage unit by counting the number of banknotes fed into the storage unit and the number of banknotes fed out of the storage unit. However, since the banknote handling device does not identify the individual banknotes, the banknote handling device cannot manage the order of banknotes stored in each storage unit. In this case, the functions of the banknote handling device are limited.

When any situation occurs in which the banknote handling device cannot guarantee the order of banknotes stored in any storage unit, such as when any of the storage units is detached from the banknote handling device, the banknote handling device needs to stop managing the banknotes based on the serial numbers. In this case, if the banknote handling device stops managing the banknotes based on the serial numbers for all of the storage units, the functions of the banknote handling device may be unnecessarily limited.

The technique disclosed herein reduces such unnecessarily limitation in a banknote handling device.

The technique disclosed herein relates to a sheet handling device that handles a sheet. The sheet handling device includes: a storage unit including a first storage unit that stores the sheet, and a second storage unit that stores the sheet in a different storage manner from the first storage unit; a transport unit that transports the sheet inside the sheet handling device; and a control unit that manages the sheet stored in the first storage unit and the second storage unit. When the control unit determines that the sheet handling device satisfies a first condition, the control unit switches a mode from a first mode to a second mode to manage the sheet related to the first storage unit. When the control unit determines that the sheet handling device satisfies a second condition different from the first condition, the control unit switches the mode from the first mode to the second mode to manage the sheet related to the second storage unit.

The control unit switches the mode of the first storage unit and the mode of the second storage unit under different conditions according to the storage manner. Since the condition for switching the mode is not the same between the first storage unit and the second storage unit, the use or functions of the sheet handling device are less likely to be unnecessarily limited.

The sheet handling device may further include a recognition unit that acquires a serial number of the sheet being transported by the transport unit. The first mode may be a mode in which the control unit manages the number of sheets stored in the storage unit based on the serial number acquired by the recognition unit, and the second mode may be a mode in which the control unit manages the number of sheets stored in the storage unit based on the number of sheets fed into the storage unit and the number of sheets fed out of the storage unit.

The control unit switches the mode from the first mode in which the control unit manages the number of sheets based on the serial number to the second mode in which the control unit manages sheets based on the numbers of sheets fed into and fed out of the storage unit under different conditions according to the storage manner of the storage unit. This reduces unnecessary limitation on the functions of the sheet handling device.

The sheet handling device may further include a detection unit that is located in the transport unit and that detects the sheet being transported. The control unit may perform a checking process of checking the number of sheets stored in the storage unit based on a detection result of the sheet fed out of the storage unit from the detection unit. The first mode may be a mode in which the checking process is not required, and the second mode may be a mode in which the checking process is required. In the second mode, the control unit may perform a process of allowing use of the storage unit after performing the checking process.

When in the second mode, the storage unit cannot be used until the control unit performs the checking process. Whether the checking process is required depends on the storage manner of the storage unit. This reduces unnecessary switching to the second mode.

The sheet may be a banknote, and the detection unit may detect an image of the banknote and a serial number of the banknote.

Since the detection unit detects the serial number, the control unit can manage the number of sheets stored in the storage unit based on the serial number.

The detection unit may detect the image of the banknote and a denomination of the banknote.

Since the detection unit detects the denomination of the banknote, the control unit can more appropriately manage the banknote stored in the storage unit.

The first storage unit may be a stack storage unit that stores the sheet by stacking the sheet in a vertical direction with a face or back of the sheet facing downward or by arranging the sheet in a horizontal direction with the face or back of the sheet facing horizontally, and the second storage unit may be a tape storage unit that stores the sheet by winding the sheet together with a tape around a drum.

Since the condition for switching the mode is different between the stack storage unit and the tape storage unit, unnecessary limitation on the use or functions of the sheet handling device is reduced.

The first storage unit may include one storage area for the sheet, and the second storage unit may include a plurality of storage areas for the sheet, the storage areas being independent of each other.

The first storage unit and the second storage unit are different in structure. Since the condition for switching the mode is different between the first storage unit and the second storage unit, unnecessary limitation on the use or functions of the sheet handling device is reduced.

The first storage unit may include a cover that covers the storage area for the sheet, and the first condition may be that the storage area is exposed by movement of the cover.

When the cover is moved and the storage area is exposed, a user can touch the sheet stored in the storage area. By determining the first condition suitable for the structure of the first storage unit, the sheet handling device can properly switch the mode.

The sheet handling device may further include a housing that houses the first storage unit and the second storage unit. The housing may include an opening and closing unit that exposes inside of the housing. The second condition may be that the inside of the housing is exposed by movement of the opening and closing unit.

By appropriately determining the second condition, unnecessary limitation on the functions of the sheet handling device is reduced.

The first storage unit and the second storage unit may be detachable from the sheet handling device, and the second condition may be that the second storage unit is detached from the sheet handling device.

By appropriately determining the second condition, unnecessary limitation on the functions of the sheet handling device is reduced.

In the second mode, the control unit may switch the mode from the second mode to the first mode after performing a checking process of checking the serial number of the sheet stored in the storage unit and the number of sheets stored in the storage unit by causing the storage unit to feed out the sheet and causing the recognition unit to acquire the serial number of the sheet fed out of the storage unit.

The mode is thus appropriately switched from the second mode to the first mode.

The sheet handling device may further include a notification unit that performs a notification to the user. In the second mode, the control unit may control the notification unit to notify the user that the mode is the second mode.

Since the notification unit performs a notification to the user, the user can recognize that the mode is the second mode.

The control unit may control the notification unit to perform a notification to the user to prompt the user to perform the checking process.

Performing such a notification to the user facilitates switching from the second mode to the first mode.

The storage unit may include a plurality of the first storage units. In a case that the control unit manages the sheet related to the first storage unit in the second mode, the control unit may perform a process of allowing use of the plurality of first storage units after performing the checking process on all the first storage units.

The sheets stored in the plurality of first storage unit are thus properly managed according to the storage manner of the first storage units.

The storage unit may include a plurality of the second storage units. In a case that the control unit manages the sheet related to the second storage unit in the second mode, the control unit may perform a process of allowing use of the second storage unit that satisfies the second condition after performing the checking process on that second storage unit, and permits use of the second storage unit that does not satisfy the second condition.

The sheets stored in the second storage units are thus properly managed according to the storage manner of the second storage units.

Figure 10:
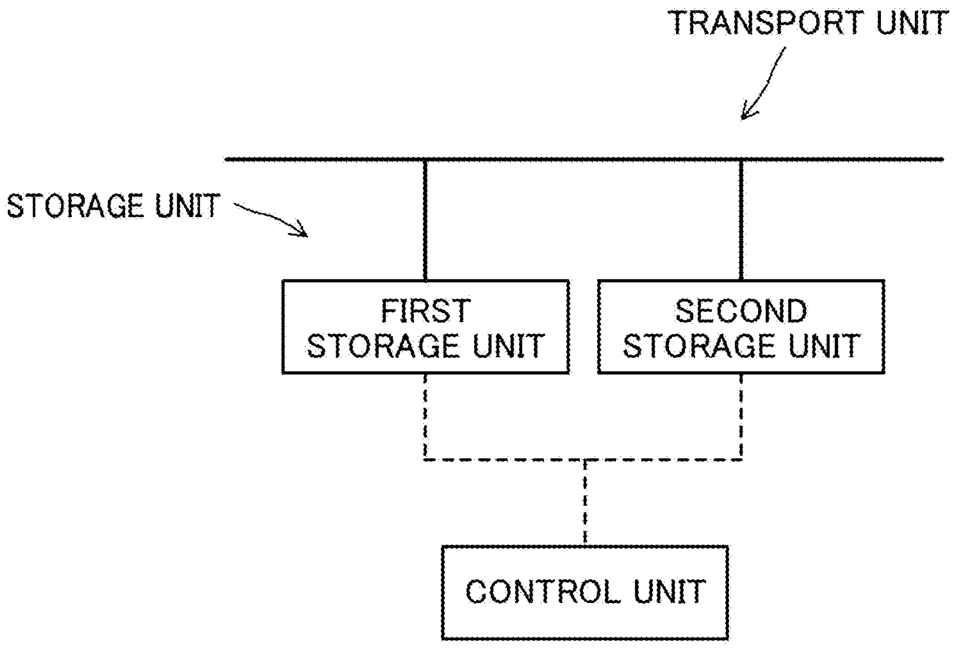
FIG. 10 illustrates the configuration of a sheet handling device.

An embodiment of a sheet handling device will be described with reference to the accompanying drawings. The sheet handling device described herein is illustrated by way of example only. FIG. 10 illustrates a sheet handling device. The sheet handling device includes: a storage unit including a first storage unit that stores sheets and a second storage unit that stores sheets in a different storage manner from the first storage unit; a transport unit that transports sheets inside the sheet handling device; and a control unit that controls the sheets stored in the first storage unit and the second storage unit.

When the control unit determines that the sheet handling device satisfies a first condition, the control unit switches from a first mode to a second mode to manage the sheets related to the first storage unit. When the control unit determines that the sheet handling device satisfies a second condition different from the first condition, the control unit switches from the first mode to the second mode to manage the sheets related to the second storage unit.

The control unit switches the mode of the first storage unit and the mode of the second storage unit under different conditions according to the storage manner. Since the condition for switching the mode is not the same between the first storage unit and the second storage unit, the use or functions of the sheet handling device are less likely to be unnecessarily limited.

FIG. 1 shows a banknote handling device 1 as a second configuration example of the sheet handling device of FIG. 10. The banknote handling device 1 is installed in financial institutions such as banks. For example, the banknote handling device 1 can also be installed in back offices of retail stores. The banknote handling device 1 performs processes related to banknotes.

(Overall Configuration of Banknote Handling Device)

FIG. 1 illustrates the internal structure of the banknote handling device 1. In the following description, the side of the banknote handling device 1 on which a first door 131, which will be described later, is located in FIG. 1 is sometimes referred to as the front, and the opposite side of the banknote handling device 1 from the side on which the first door 131 is located is sometimes referred to as the rear.

The banknote handling device 1 handles loose notes. The banknote handling device 1 includes a handling unit 11 located in the upper part of the banknote handling device 1 and a safe unit 12 located in the lower part of the banknote handling device 1. The safe unit 12 includes a first safe unit 121 and a second safe unit 122.

The handling unit 11 includes an upper housing 111. A deposit unit 21, a dispense unit 22, a recognition unit 23, and a part of a transport path are disposed in the upper housing 111.

The safe unit 12 includes a safe housing 13. The safe housing 13 is divided into two pans. Storage units and apart of the transport path are disposed in the safe housing 13. The safe housing 13 protects the storage units at a predetermined security level or higher. The security level of the safe housing 13 is higher than that of the upper housing 111.

The safe housing 13 has the first door 131 and a second door 132. The first door 131 has an electronic lock 133. The first door 131 opens when a user unlocks the electronic lock 133. When the first door 131 is opened, the user can pull out the storage units in the first safe unit 121 forward of the banknote handling device 1 as shown by long dashed double-dotted lines in FIG. 1.

The user can pull out storage units 31, 32, and 34, which will be described later, supported by a support unit 30 forward of the banknote handling device 1. The user can detach the storage units 31, 32, and 34 from the support unit 30 after pulling out the storage units 31, 32, and 34.

The second door 132 also has an electronic lock 134. The second door 132 opens when the user unlocks the electronic lock 134. Although not shown in the figure, when the second door 132 is opened, the user can pull out the storage unit in the second safe unit 122 forward of the banknote handling device 1.

A person who can unlock the electronic lock 133 is a specially authorized person. A person who can unlock the electronic lock 134 is also a specially authorized person. The person who can unlock the electronic lock 133 and the person who can unlock the electronic lock 134 are not necessarily the same.

The deposit unit 21 is a portion into which banknotes to be deposited are placed in, for example, a deposit process. The user manually places banknotes into the deposit unit 21. The deposit unit 21 holds a plurality of banknotes in a stacked state. The deposit unit 21 has a mechanism that takes banknotes one by one into the banknote handling device 1.

The dispense unit 22 is a portion that holds dispensed banknotes in, for example, a withdrawal process. The dispense unit 22 can be used for various purposes. The dispense unit 22 holds a plurality of banknotes in a stacked state. The user can manually take the banknotes out of the dispense unit 22.

The recognition unit 23 is disposed on a loop transport path 41 that will be described later. The recognition unit 23 recognizes at least the authenticity, denominations, and fitness of banknotes by detecting the banknotes being transported on the loop transport path 41 and acquiring an image of each banknote. The recognition unit 23 also acquires the serial numbers of the banknotes. The recognition unit 23 is an example of the detection unit.

The recognition unit 23 also recognizes abnormal transport of the banknotes. Abnormal transport means that banknotes are not being transported in a predetermined normal state. An example of the abnormal transport is skewed notes, namely banknotes being skewed at an angle larger than a predetermined allowable angle with respect to the transport direction. Another example of the abnormal transport is chained notes, namely banknotes with a distance therebetween smaller than an allowable distance.

A total of seven storage units are provided (that is, storage units 31, 32, 33, and 34). The first type stack storage unit 31 stores banknotes by stacking them in the vertical direction with their face or back facing downward. The banknote handling device 1 includes first, second, and third stack storage units 31. The stack storage units 31 are storage cassettes that are detachable from the banknote handling device 1. The stack storage units 31 can feed out their stored banknotes. The first, second, and third stack storage units 31 are disposed next to each other in the longitudinal direction of the banknote handling device 1 in the rear part of the first safe unit 121. For example, the first, second, and third stack storage units 31 store banknotes by denomination.

Figure 3:
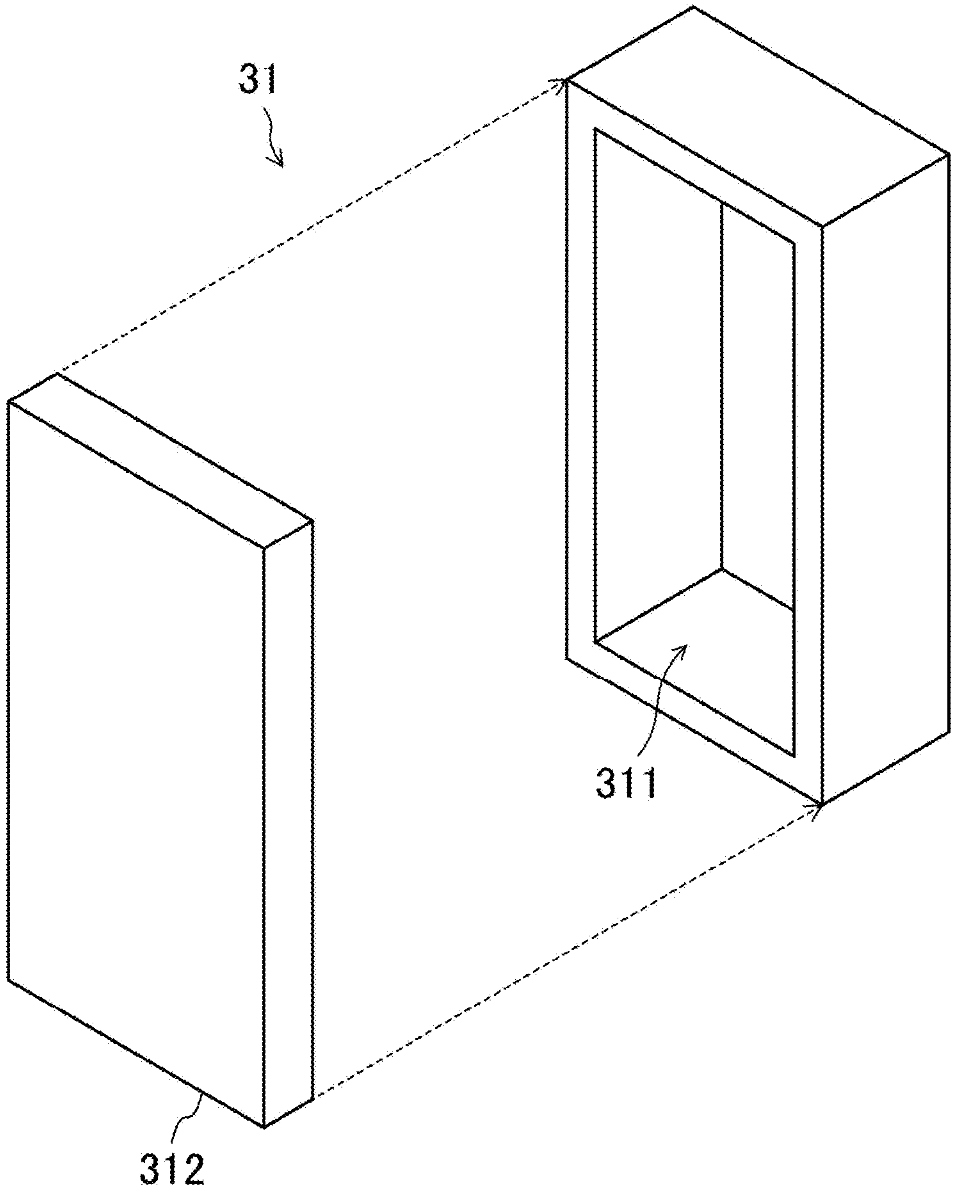
FIG. 3 is a perspective view schematically showing the configuration of a first type stack storage unit.

FIG. 3 schematically illustrates the configuration of the first type stack storage unit 31. The first type stack storage unit 31 is in the shape of a vertically long box. The first type stack storage unit 31 has, inside its body, a storage area 311 for storing banknotes. The first type stack storage unit 31 has a cover 312. The cover 312 covers the storage area 312. When the cover 312 is closed, the user cannot touch the banknotes stored in the storage area 311. As shown in FIG. 3, when the cover 312 is removed, the storage area 311 is open, so that the user can manually take the banknotes out of the storage area 311.

Figure 4:
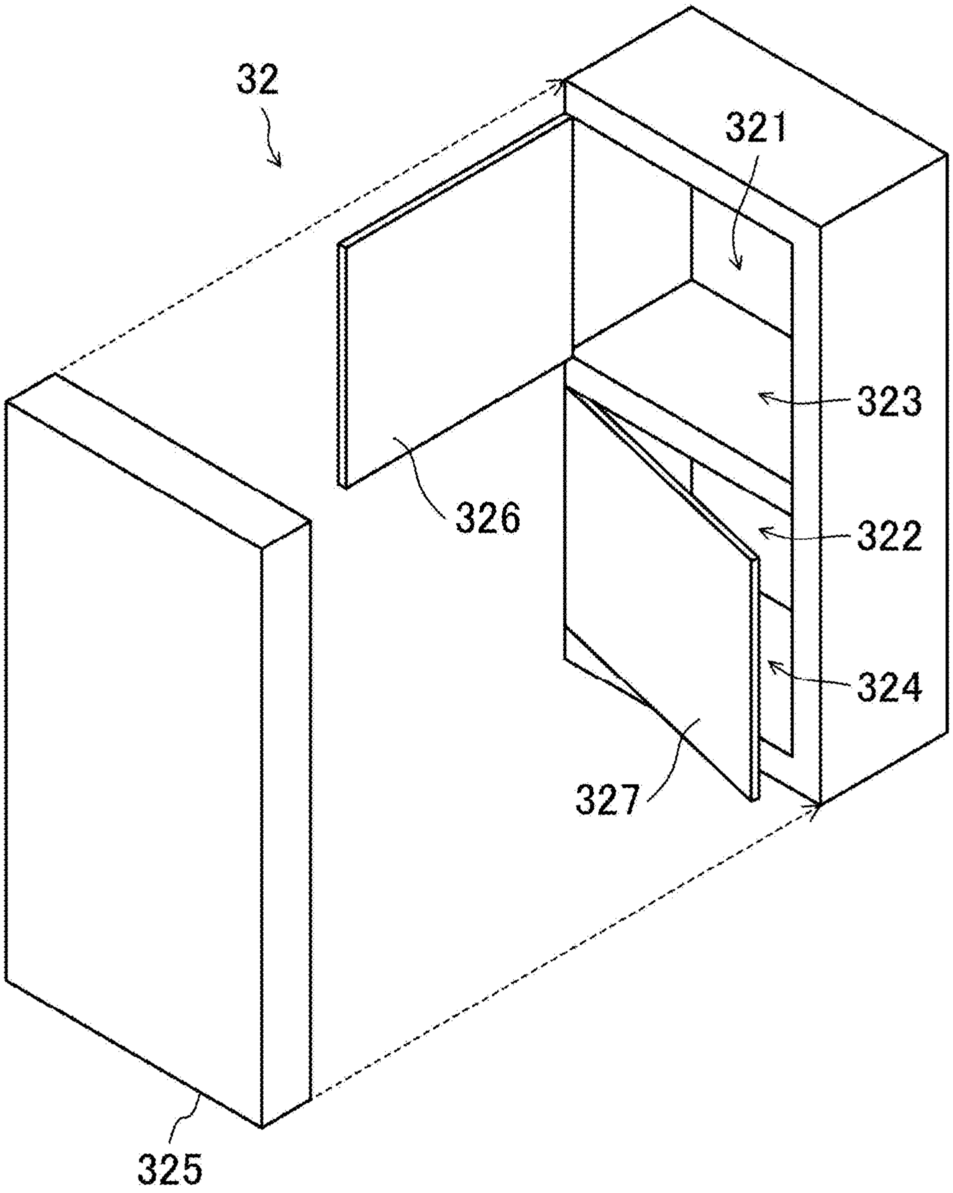
FIG. 4 is a perspective view schematically showing the configuration of a second type stack storage unit.

FIG. 4 schematically illustrates the configuration of the second type stack storage unit 32. The second type stack storage unit 32 also stores banknotes by stacking them in the vertical direction with their face or back facing downward. The stack storage unit 32 is disposed in the front part of the first safe unit 121. The stack storage unit 32 is horizontally divided into two parts. The stack storage unit 32 has an upper storage unit 321 and a lower storage unit 322. The banknotes stored in the upper storage unit 321 and the lower storage unit 322 can be fed out of the upper storage unit 321 and the lower storage unit 322. For example, the upper storage unit 321 can be a reject note storage area for storing banknotes rejected during a withdrawal process. The lower storage unit 322 can be a multipurpose storage unit. The stack storage unit 32 can be used for various purposes.

The second type stack storage unit 32 is also in the shape of a vertically long box. The second type stack storage unit 32 has two storage areas 323, 324 inside. The two storage areas 323, 324 are independent of each other. The upper storage area 323 forms the upper storage unit 321, and the lower storage area 324 forms the lower storage unit 322. The second type stack storage unit 32 also has a cover 325. The cover 325 covers the storage areas 323, 324. When the cover 325 is closed, the user cannot touch the banknotes stored in the storage areas 323, 324.

The second type stack storage unit 32 further has inner doors 326, 327 for each storage area 323, 324. As shown in FIG. 4, when the cover 325 is removed and the inner door 326 is opened, the storage area 323 of the upper storage unit 321 is open, so that the user can manually take the banknotes out of the upper storage unit 321. When the inner door 327 is opened, the storage area 324 of the lower storage unit 322 is open, so that the user can manually take the banknotes out of the lower storage unit 322.

The stack storage unit 33 stores banknotes by arranging them in the horizontal direction with their face or back facing horizontally. The stack storage unit 33 cannot feed out its stored banknotes. The stack storage unit 33 is disposed in the second safe unit 122. The user can take the stack storage unit 33 out of the second safe unit 122. For example, the stack storage unit 33 can be used as a collection cassette. In the following description, the stack storage unit 33 is sometimes referred to as the collection cassette 33.

Figure 5:
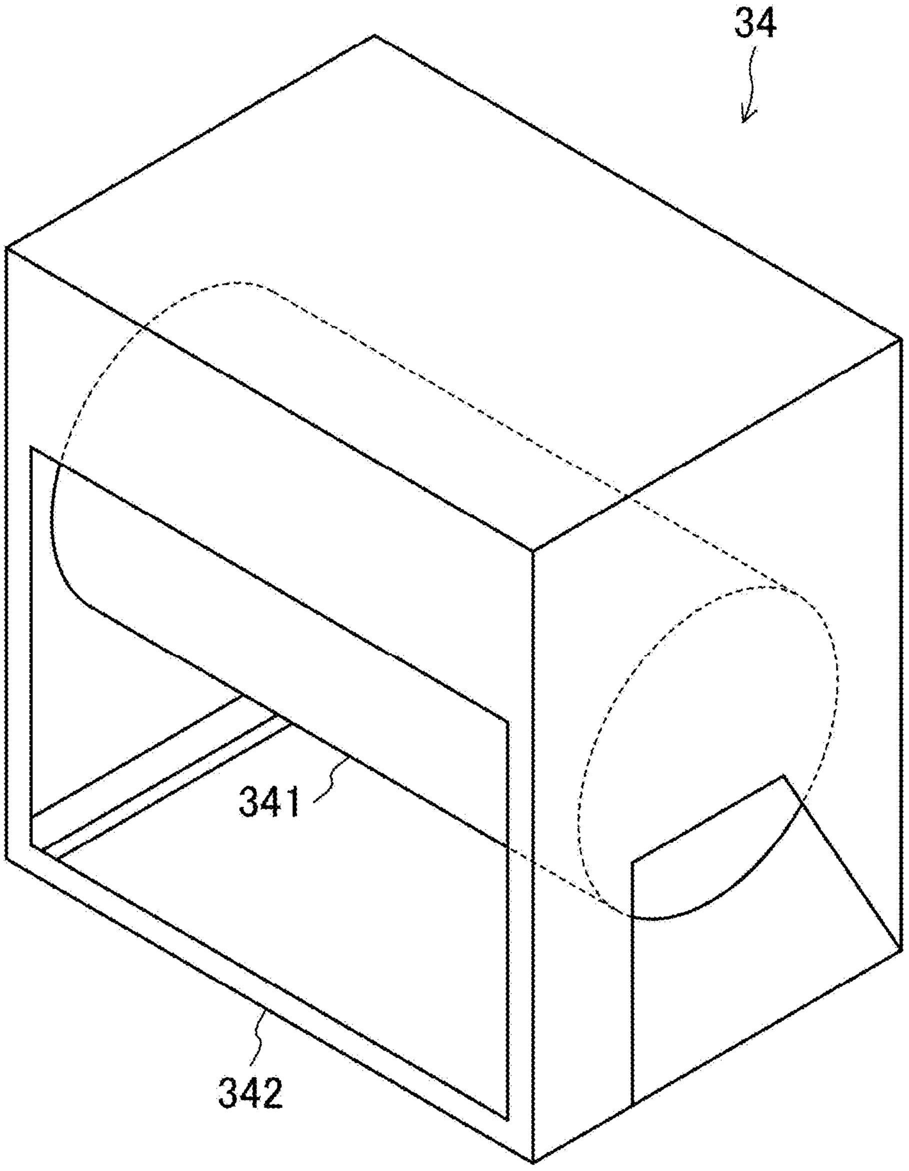
FIG. 5 is a perspective view schematically showing the configuration of a tape storage unit.

FIG. 5 schematically illustrates the configuration of the tape storage unit 34. The tape storage unit 34 stores banknotes by winding the banknotes together with a tape around a drum. The tape storage unit 34 is different from the stack storage units 31, 32, and 33 in the method by which the banknotes are stored. The banknote handling device 1 includes first and second tape storage units 34. The tape storage units 34 are storage units that are detachable from the banknote handling device 1. The tape storage units 34 can feed out their stored banknotes. The first and second tape storage units 34 are disposed vertically next to each other in the middle part of the first safe unit 121.

The tape storage unit 34 is in the shape of a box. The tape storage unit 34 has a frame 342 housing a drum 341. The frame 342 does not completely cover the drum 341. At least a part of the drum 341 is exposed. The tape storage unit 34 does not have a cover or a door. The user can touch the banknotes wound around the drum 341 without performing any specific operation.

A known storage structure can be used as appropriate for the stack storage units 31, 32, and 33. A known storage structure can also be used as appropriate for the tape storage units 34. The number of storage units, the configuration of the storage units, and the arrangement of the storage units in the banknote handling device 1 are not limited to the number, configuration, and arrangement described above.

Although not shown in the figures, sensors that detect passage of banknotes are mounted at the inlet and outlet of each storage unit 31, 32, 33, and 34. A control unit 15, which will be described later, counts the number of banknotes fed into the storage unit and the number of banknotes fed out of the storage unit, based on detection signals from the sensors. The control unit 15 manages the number of banknotes stored in the storage unit based on the counted number of banknotes (quantity management mode that will be described later).

A transport unit 4 transports banknotes within the banknote handling device 1. The transport unit 4 has a transport path. Although not shown in the figures, the transport path is composed of a combination of a large number of rollers, a plurality of belts, a motor for driving the rollers and the belts, and a plurality of guides. For example, the transport unit 4 transports banknotes one by one on the transport path with their long edges facing in the transport direction with an interval between the banknotes. The transport unit 4 may transport banknotes with their short edges facing in the transport direction.

The transport unit 4 has the loop transport path 41. The loop transport path 41 is located in the upper housing 111. The transport unit 4 transports banknotes on the loop transport path 41 in the clockwise and counterclockwise directions in FIG. 1.

The deposit unit 21 is connected to the loop transport path 41 via a connection path 42. The dispense unit 22 is connected to the loop transport path 41 via a connection path 43.

The first, second, and third stack storage units 31 are connected to the loop transport path 41 via connection paths 44. The three connection paths 44 extend in both the handling unit 11 and the first safe unit 121 in the vertical direction. The transport unit 4 transports banknotes to each of the first, second, and third stack storage units 31 or transports banknotes from each of the first, second, and third stack storage units 31.

The upper storage unit 321 of the second type stack storage unit 32 is connected to the loop transport path 41 via a connection path 45. The transport unit 4 transports banknotes to the upper storage unit 321 or transports banknotes from the upper storage unit 321.

The lower storage unit 321 is connected to the loop transport path 41 via a connection path 46. The connection path 46 diverges at an intermediate position. The lower storage unit 321 is connected to a path diverging from the connection path 46. The transport unit 4 transports banknotes to the lower storage unit 322 or transports banknotes from the lower storage unit 322. The connection path 46 extends in all of the handling unit 11, the first safe unit 121, and the second safe unit 122 in the vertical direction.

Each of the first and second tape storage units 34 is connected to the loop transport path 41 via the connection path 46. Each of the first and second tape storage units 34 is connected to a path diverging from the connection path 46. The transport path 4 transports banknotes to each of the first and second tape storage units 34 or transports banknotes from each of the first and second tape storage units 34. The collection cassette 33 is connected to the loop transport path 41 via the connection path 46.

Although not shown in the figures, diverter mechanisms that divert banknotes are provided at the connection points between the loop transport path 41 and the connection paths 42, 43, 44, 45, and 46. A diverter mechanism is also provided at each diverging point of the connection path 46.

Tracking sensors 49 (see FIG. 6) that detect passage of banknotes are disposed at various positions on the loop transport path 41 and the connection paths 42, 43, 44, 45, and 46. The transport unit 4 receives commands from the control unit 15 that will be described later and controls each diverter mechanism based on the detection signals from the tracking sensors 49 to transport banknotes to a predetermined transport destination. The tracking sensor 49 is an example of the detection unit.

The banknote handling device 1 has a temporary storage unit 38 in the upper housing 111. The temporary storage unit 38 temporarily stores banknotes to be deposited in, for example, a deposit process. The temporary storage unit 38 can be used for various purposes. The temporary storage unit 38 is disposed in the front part of the upper housing 111. The temporary storage unit 38 is connected to the loop transport path 41 via a connection path 47. The temporary storage unit 38 is a tape storage unit. A known configuration can be used as appropriate for the temporary storage unit 38. The storage method of the temporary storage unit 38 is the same as or substantially the same as that of the tape storage units 34. A storage unit having the same configuration as the tape storage units 34 may be used as the temporary storage unit 38.

Figure 2:
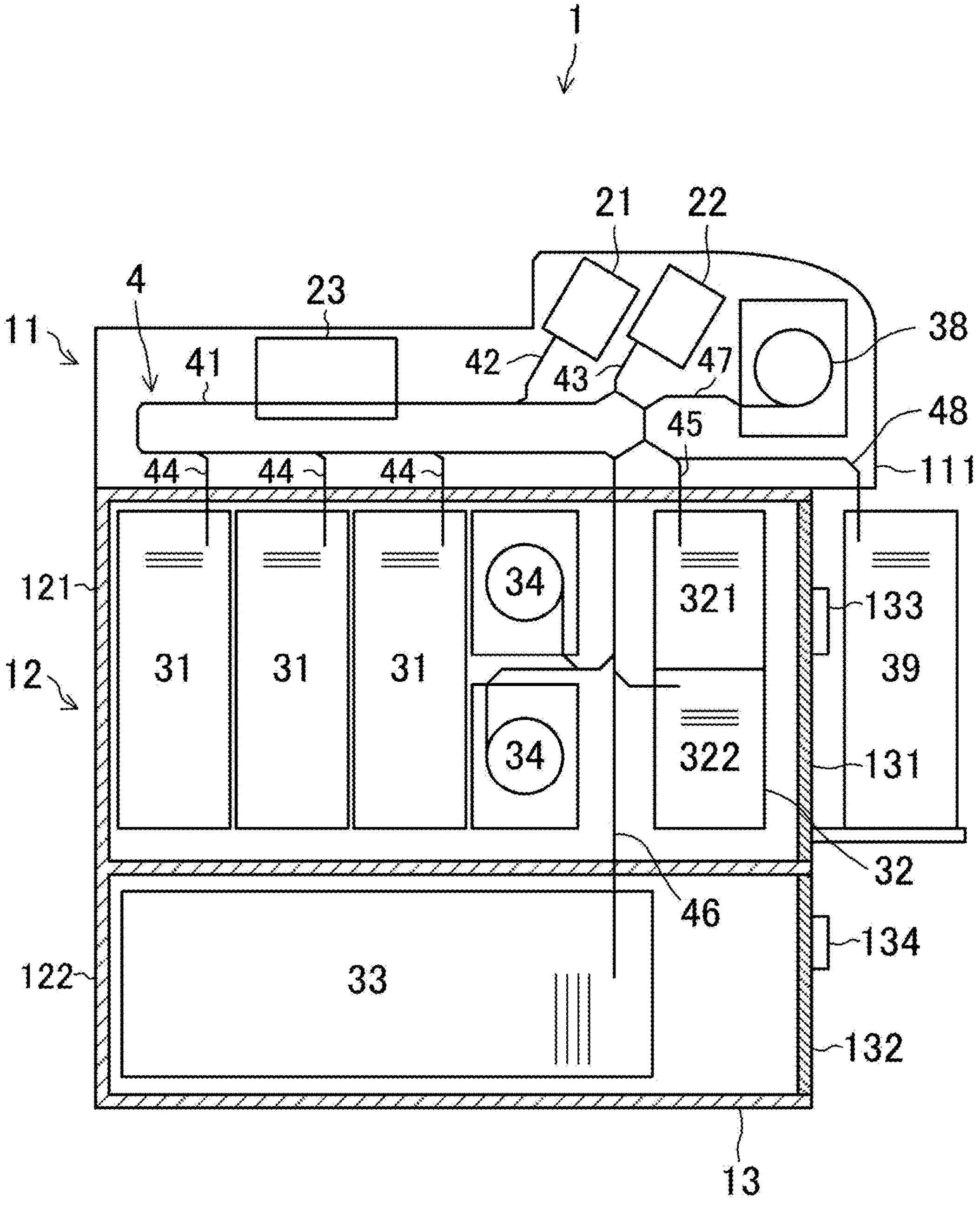
FIG. 2 shows the banknote handling device with a secure transfer cassette attached thereto.

As shown in FIG. 2, a secure transfer cassette (STC) 39 can be attached to the banknote handling device 1. The STC 39 is detachable from the banknote handling device 1. The STC 39 is a detachable storage unit. The STC 39 is a stack storage unit. A known configuration can be used as appropriate for the STC 39.

The banknote handling device 1 has a cover 135. The cover 135 is attached to the safe housing 13 so as to cover the first door 131. The cover 135 can be moved to the position where the cover 135 covers the first door 131 as shown in FIG. 1 and the position where the cover 135 does not cover the first door 131, which is not shown in the figure.

The user opens the cover 135 when attaching the STC 39 to the banknote handling device 1. The user does not open the first door 131 at this time. The opened cover 135 is not shown in FIG. 2. The STC 39 is attached in front of the first door 131 when used in the banknote handling device 1. The STC 39 is connected to the loop transport path 41 via a connection path 48.

Figure 6:
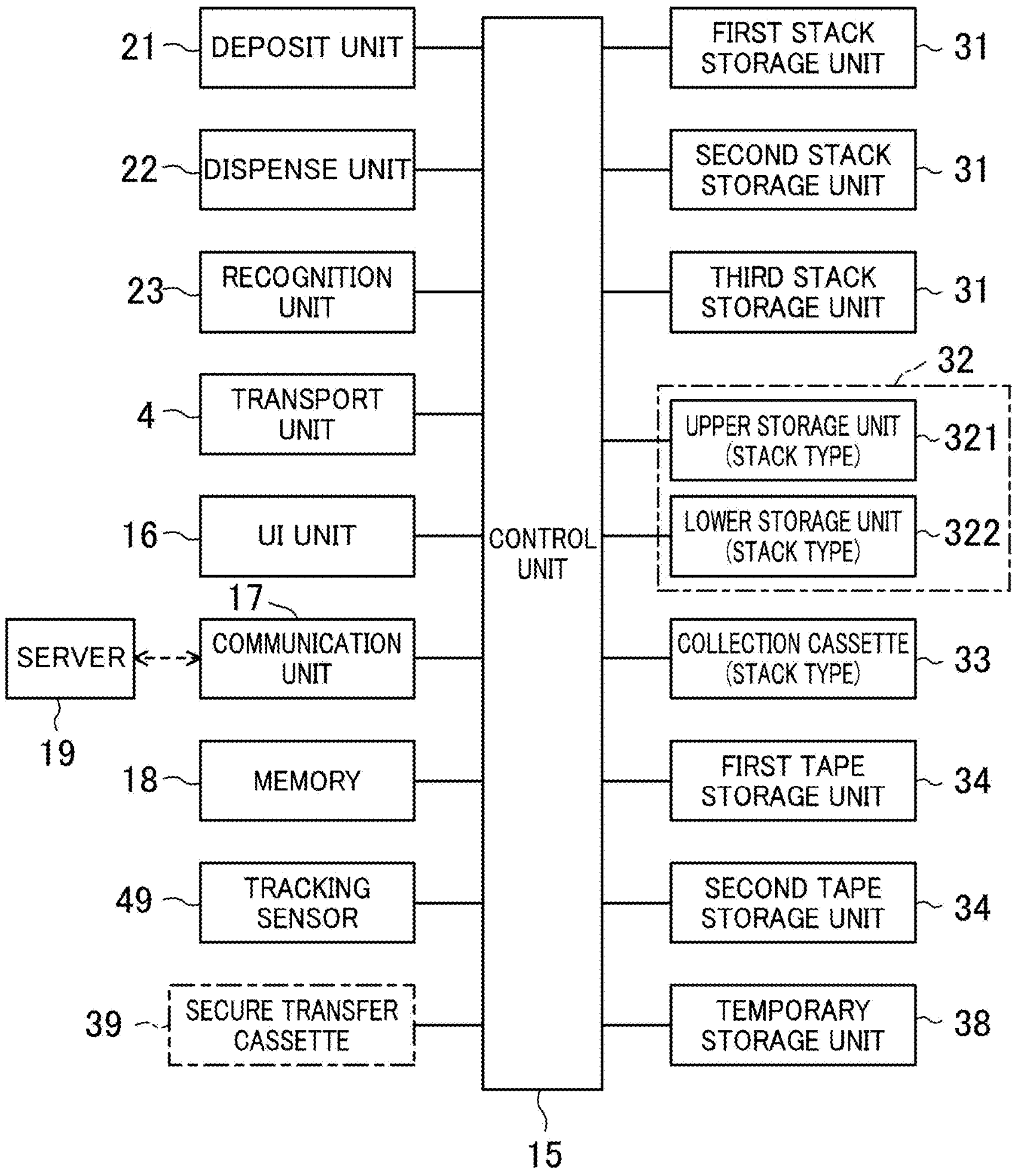
FIG. 6 is a block diagram illustrating the configuration of the banknote handling device.

FIG. 6 is a block diagram illustrating the configuration of the banknote handling device 1. The banknote handling device 1 includes the control unit 15. The deposit unit 21, the dispense unit 22, the recognition unit 23, the transport unit 4, the storage units 31, 32, 33, and 34, and the temporary storage unit 38, which are described above, are connected to the control unit 15 so that signals can be transferred between these units and the control unit 15.

When the STC 39 is attached to the banknote handling device 1, the STC 39 is also connected to the control unit 15 so that signals can be transferred therebetween.

The banknote handling device 1 includes an UI unit 16 that is an interface to the user, a communication unit 17 for communicating with a server 19, and a memory 18 for storing various kinds of data etc. The UI unit 16, the communication unit 17, and the memory 18 are also connected to the control unit 15 so that signals can be transferred between these units and the control unit 15. For example, the UI unit 16 may be a touch panel display device. The UI unit 16 includes an output unit that outputs various sounds. The "sounds" as used herein include voice.

For example, when the user instructs to perform a process via the UI unit 16, the control unit 15 outputs signals to the deposit unit 21, the dispense unit 22, the recognition unit 23, the transport unit 4, and the storage units 31, 32, 33, and 34, the temporary storage unit 38, and the STC 39 to perform the process according to the instruction.

How the banknote handling device 1 operates to perform processes will be briefly described. Each unit operates as described below as the control unit 15 controls each unit of the banknote handling device 1.

(Deposit Process)

The user places banknotes to be deposited into the deposit unit 21. The deposit unit 21 takes the banknotes one by one into the banknote handling device 1. The transport unit 4 transports the banknotes to the recognition unit 23. The recognition unit 23 recognizes the banknotes. The transport unit 4 transports the banknotes having passed through the recognition unit 23 to the temporary storage unit 38. The temporary storage unit 38 stores the banknotes.

The transport unit 4 transports any banknote recognized as a reject note by the recognition unit 23 to the dispense unit 22. The transport unit 4 also transports any banknote determined to be a reject note after passing through the recognition unit 23 to the dispense unit 22. The user places the banknotes returned to the dispense unit 22 back into the deposit unit 21. The banknotes thus placed back into the deposit unit 21 are taken back into the banknote handling device 1.

When all the banknotes placed into the deposit unit 21 are taken into the banknote handling device 1, the UI unit 16 displays the deposit amount. When the user operates the UT unit 16 to confirm the deposit process, the temporary storage unit 38 feeds out the stored banknotes. The transport unit 4 transports each of the banknotes fed out of the temporary storage unit 38 to a desired one of the storage units 31, 32, 33, and 34. The storage units 31, 32, 33, and 34 thus store the banknotes. The deposit process ends when the storage units 31, 32, 33, and 34 store the banknotes. The memory 18 stores information on the banknotes stored in the storage units 31, 32, 33, and 34.

In the deposit process, the transport unit 4 may directly transport the banknotes from the deposit unit 21 to the storage units 31, 32, 33, and 34, and the storage units 31, 32, 33, and 34 may store the banknotes. The temporary storage unit 38 may not be used in the deposit process.

(Withdrawal Process)

In a withdrawn process, the storage units 31, 34 feed out banknotes to be withdrawn. The transport unit 4 transports the banknotes to the recognition unit 23. The recognition unit 23 recognizes the banknotes. The transport unit 4 transports the recognized banknotes to the dispense unit 22.

The transport unit 4 transports any banknote recognized as a reject note by the recognition unit 23 to the upper storage unit 321 of the second type stack storage unit 32. The upper storage unit 321 stores the banknotes rejected during the withdrawal process.

The withdrawal process ends when all the banknotes to be withdrawn are accumulated in the dispense unit 22. The memory 18 erases information on the banknotes dispensed to the dispense unit 22.

(Replenishment Process)

A replenishment process is a process of replenishing the storage units 31, 34 with banknotes. The replenishment process is performed in a manner similar to that of the deposit process. The user places banknotes for replenishment into the deposit unit 21. The deposit unit 21 takes the banknotes one by one into the banknote handling device 1.

The transport unit 4 transports the banknotes to the recognition unit 23. The recognition unit 23 recognizes the banknotes. The transport unit 4 transports the banknotes having passed through the recognition unit 23 to the storage units 31, 34. The storage units 31, 34 store the banknotes. The replenishment process ends when all the banknotes placed into the deposit unit 21 are stored in the storage units 31, 34. The memory 18 stores information on the banknotes stored in the storage units 31, 34. The memory 18 can store information such as denominations, serial numbers, and the number of banknotes regarding the banknotes stored in the storage units 31, 34.

The user may use the STC 39 for the replenishment process. Specifically, the user attaches the STC 39 storing banknotes for replenishment to the banknote handling device 1. The STC 39 feeds out the banknotes one by one, and the banknotes fed out of the STC 39 are taken into the banknote handling device 1 via the transport unit 4. The storage units 31, 34 store the recognized banknotes. The replenishment process ends when all the banknotes in the STC 39 are stored in the storage units 31, 34. The memory 18 stores information on the banknotes stored in the storage units 31, 34. When banknotes in the STC 39 are stored in the storage units 31, 34 via the recognition unit 34, the memory 18 can store information such as denominations, serial numbers, and the number of banknotes regarding the banknotes stored in the storage units 31, 34.

(Collection Process)

A collection process is a process of collecting banknotes stored in the storage units 31, 32, and 34. In the collection process, the storage units 31, 32, and 34 feed out banknotes to be collected. The transport unit 4 transports the banknotes to the recognition unit 23. The recognition unit 23 recognizes the banknotes. The transport unit 4 transports the recognized banknotes to the collection cassette 33. The collection cassette 33 stores the banknotes.

When all the banknotes to be collected are stored in the collection cassette 33, a person in charge from, e.g., a cash-in-transit company unlocks the electronic lock 134 and opens the second door 132. The person in charge takes the collection cassette 33 out of the second safe unit 122. The person in charge collects the banknotes to be collected together with the collection cassette 33. The memory 18 erases information on the collected banknotes.

The person in charge may use the STC 39 for the collection process. Specifically, the person in charge attaches an empty STC 39 to the banknote handling device 1. The transport unit 4 transports the recognized banknotes to the STC 39. The STC 39 stores the banknotes. When all the banknotes to be collected are stored in the STC 39, the person in charge detaches the STC 39 from the banknote handling device 1. The person in charge collects the banknotes to be collected together with the STC 39. The memory 18 erases information on the collected banknotes.

(Reconciliation Process)

A reconciliation process is a checking process of checking banknotes stored in the storage units 31, 32, and 34 that can feed out their stored banknotes. When the first type stack storage units 31 and the second type stack storage unit 32 are to be reconciliated, the reconciliation process is performed using the STC 39. When the tape storage units 34 are to be reconciliated, the reconciliation process is performed using the temporary storage unit 38.

The storage units 31, 32, and 34 to be reconciliated feed out their stored banknotes. The transport unit 4 transports the banknotes to the recognition unit 23. The recognition unit 23 recognizes the banknotes. The transport unit 4 transports the recognized banknotes to the STC 39 or the temporary storage unit 38. The STC 39 or the temporary storage unit 38 stores the banknotes.

After the storage units 31, 32, and 34 to be reconciliated finish feeding out the banknotes, the STC 39 or the temporary storage unit 38 feeds out their stored banknotes. The transport unit 4 transports the banknotes to the recognition unit 23. The recognition unit 23 recognizes the banknotes again. The transport unit 4 transports the recognized banknotes back to their original storage units 31, 32, and 34. The storage units 31, 32, and 34 store the banknotes. The reconciliation process ends when all the banknotes are stored back in the storage units 31, 32, and 34. The memory 18 stores information on the banknotes stored in the storage units 31, 32, and 34 based on the reconciliation results. It should be noted that the recognition unit 23 may recognize the banknotes only once in the reconciliation process.

(Example of Management Mode Switching: Switching Between Serial Number Management Mode and Quantity Management Mode)

Next, switching between a serial number management mode and a quantity management mode and each mode will be described.

The control unit 15 manages the number of banknotes stored in each storage unit 31, 32, 33, 34 based on their serial numbers (serial number management mode). In the serial number management mode, the control unit 15 identifies individual banknotes. Therefore, the control unit 15 can manage the order of banknotes stored in each storage unit 31, 32, 33, 34. Since the control unit 15 manages the order of banknotes, the control unit 15 can confirm the number of banknotes remaining in each storage unit 31, 32, 33, and 34 by feeding at least one banknote out of each storage unit 31, 32, 33, and 34 and checking its serial number. The control unit 15 can check the inventory amount of each storage unit 31, 32, 33, 34 without feeding all the banknotes out of each storage unit 31, 32, 33, 34. That is, the control unit 15 can complete the reconciliation process for each storage unit 31, 32, 33, 34 based on at least one banknote fed out of the storage unit 31, 32, 33, 34. This reconciliation process is called partial reconciliation process as will be described later. The serial number management mode is an example of the first mode.

The control unit 15 also manages the number of banknotes stored in each storage unit 31, 32, 33, 34 based on the number of banknotes fed into each storage unit 31, 32, 33, 34 and the number of banknotes fed out of each storage unit 31, 32, 34 (quantity management mode). In the quantity management mode, the control unit 15 recognizes the number of banknotes but not their serial numbers. Therefore, the control unit 15 cannot manage the order of banknotes. Accordingly, in the quantity management mode, the control unit 15 needs to feed out all the banknotes stored in each storage unit 31, 32, 34 in order to perform the reconciliation process for the storage units 31, 32, and 34. Since the partial reconciliation process cannot be performed in the quantity management mode, a part of the functions of the banknote handling device 1 is limited. The quantity management mode is an example of the second mode.

When the control unit 15 cannot manage banknotes in the serial number management mode, the control unit 15 can manage banknotes in the quantity management mode. Since the banknote handling device 1 has the two management modes, the serial number management mode and the quantity management mode, the possibility of the banknote handling device 1 being stopped due to the inventory amount of each storage unit 31, 32, 33, 34 becoming uncertain can be reduced.

As described above, the order of banknotes stored in each storage unit 31, 32, 33, 34 is also managed in the serial number management mode. Therefore, when any of the storage units 31, 32, 33, and 34 gets into a specific situation in which the order of banknotes can change, the control unit 15 cannot manage the banknotes in the serial number management mode. Specifically, the specific situation in which the order of banknotes can change is a situation in which the user can touch the banknotes stored in the storage unit 31, 32, 33, 34.

The banknote handling device 1 includes the first type stack storage units 31, the second type stack storage unit 32, and the tape storage units 34. The stack storage units 31, 32 are advantageous in that they have a larger storage capacity than the tape storage units 34. The stack storage unit 31, 32 are also advantageous in that banknotes can be transported at a higher transport speed to the stack storage units 31, 32 than to the tape storage units 34 when storing the banknotes. On the other hand, the tape storage units 34 are advantageous in that they can store banknotes of a plurality of denominations as the order of banknotes will not change. A banknote handling device including the tape storage units 34 can handle banknotes of a larger number of denominations. Since the banknote handling device 1 include both the stack storage units 31, 32 and the tape storage units 34, the banknote handling device 1 has the advantages of both the stack storage units 31, 32 and the tape storage units 34.

As illustrated in FIG. 3, the storage area 311 of the first type stack storage unit 31 will not be open unless the cover 312 is opened. That is, the specific situation for the first type stack storage unit 31 is when the cover 312 is opened. For example, the first type stack storage unit 31 may include a sensor (not shown) for detecting attachment and detachment of the cover 312 so that the control unit 15 can determine whether the cover 312 of the first type stack storage unit 31 is opened based on information from the sensor.

As illustrated in FIG. 4, the second type stack storage unit 32 has the inner door 326, 327. Therefore, even when the cover 325 is opened, the storage areas 323, 324 will not be open unless their corresponding inner doors 326, 327 are opened. That is, the specific situation for the second type stack storage unit 32 is when the inner door 326 and/or 327 is opened. For example, the second type stack storage unit 32 may include sensors (not shown) for detecting opening and closing of at least the inner doors 326, 327 so that the control unit 15 can determine whether the inner door 326 and/or 327 of the second type stack storage unit 32 is opened based on information from the sensors. The second type stack storage unit 32 may include a sensor (not shown) for detecting opening and closing of the cover 325 so that the control unit 15 can determine whether the cover 325 of the second type stack storage unit 32 is opened based on information from the sensor.

As illustrated in FIG. 5, the drum 341 of the tape storage unit 34 is exposed. When the first door 131 of the banknote handling device 1 is opened and the storage unit 3 is pulled out of the first safe unit 121, the user can touch the banknotes wound around the drum 341. That is, the specific situation for the tape storage unit 34 is when the first door 131 is opened. For example, the banknote handling device 1 may include a sensor (not shown) for detecting opening and closing of the first door 131 so that the control unit 15 can determine whether the first door 131 is opened based on information from the sensor.

In the banknote handling device 1 including the plurality of types of storage units 31, 32, and 34, the specific situation varies with the storage manner of the storage units 31, 32, and 34. As used herein, the "storage manner of the storage unit" includes how the banknotes are stored, such as the stack type and the tape type. The "storage manner of the storage unit" also includes the structure of the storage unit such as whether it has an inner door. The "storage manner of the storage unit" further includes the attachment structure of the storage unit such as whether it is detachable or non-detachable from, for example, the banknote handling device 1.

In the banknote handling device 1, the functions of the banknote handling device 1 will be unnecessarily limited when the management mode of each storage unit 31, 32, 34 is switched from the serial number management mode to the quantity management mode under the same condition. The time required for the management process may also be unnecessarily increased when the management mode is switched from the serial number management mode to the quantity management mode under the same condition.

Accordingly, the banknote handling device 1 individually sets the condition for switching the management mode from the serial number management mode to the quantity management mode of each storage unit 31, 32, 34. That is, in the banknote handling device 1, whether to switch the management mode from the serial number management mode to the quantity management mode is determined for each storage unit.

Switching of the mode of the first type stack storage unit 31 will be described. As described above, the mode switching condition for the first type stack storage unit 31 is that its cover 312 is opened. That is, the control unit 15 switches the management mode of the first type stack storage unit 31 from the serial number management mode to the quantity management mode when the control unit 15 detects opening of the cover 312 of the first type stack storage unit 31 based on the sensor signal. For any storage unit 31 whose cover 312 is opened, the control unit 15 switches the management mode from the serial number management mode to the quantity management mode to manage that storage unit 15. For any storage unit 31 whose cover 312 is not opened, the control unit 15 maintains the serial number management mode to manage that storage unit 15. This avoids the functions being unnecessarily limited, and also reduces an increase in processing time. The control unit 15 can thus appropriately manage the banknotes stored in the first, second, and third stack storage units 31.

Next, switching of the mode of the second type stack storage unit 32 will be described. As described above, the mode switching condition for the second type stack storage unit 32 is that its inner door 326 and/or 327 is opened. That is, the control unit 15 switches the management mode of the second type stack storage unit 32 from the serial number management mode to the quantity management mode when the control unit 15 detects opening of the inner door 326 and/or 327 of the second type stack storage unit 32 based on the sensor signals. The control unit 15 switches the management mode from the serial number management mode to the quantity management mode only for the storage unit 321, 322 whose inner door 326, 327 is opened out of the upper storage unit 321 and the lower storage unit 322.

The control unit 15 maintains the serial number management mode for the storage unit 321, 322 whose inner door 326, 327 is not opened. This avoids the functions being unnecessarily limited, and also reduces an increase in processing time. The control unit 15 can thus appropriately manage the banknotes stored in the upper storage unit 321 and the lower storage unit 322.

The control unit 15 may switch the management mode from the serial number management mode to the quantity management mode of both the upper storage unit 321 and the lower storage unit 322 when one of the inner doors 326, 327 is opened. The control unit 15 can thus more strictly manage the banknotes stored in the second type stack storage unit 32. The control unit 15 may switch the management mode of each of the upper storage unit 321 and the lower storage unit 322 from the serial number management mode to the quantity management mode when the control unit 15 detects opening of the cover 325 of the second type stack storage unit 32 based on the sensor signal. The control unit 15 can thus more strictly manage the banknotes stored in the second type stack storage unit 32.

As described above, the mode switching condition for the tape storage unit 34 is that the first door 131 is opened. That is, the control unit 15 switches the management mode of each of the first and second tape storage units 34 from the serial number management mode to the quantity management mode when the control unit 15 detects opening of the first door 131 based on the sensor signal.

The control unit 15 may switch the management mode of the tape storage unit 34 from the serial number management mode to the quantity management mode when the control unit 15 detects detachment of the tape storage unit 34 from the support unit 30 based on the sensor signal. In this case, the control unit 15 may switch the management mode from the serial number management mode to the quantity management mode only for the storage unit 34 detached from the support unit 30, and may maintain the serial number management mode for the storage unit 34 that is not detached. The control unit 15 can thus appropriately manage the banknotes stored in the tape storage unit 34 while avoiding the functions of the banknote handling device 1 being unnecessarily limited. When either the first or second tape storage unit 34 is detached, the control unit 15 can switch the management mode of both the first and second tape storage units 34 from the serial number management mode to the quantity management mode.

Figure 7:
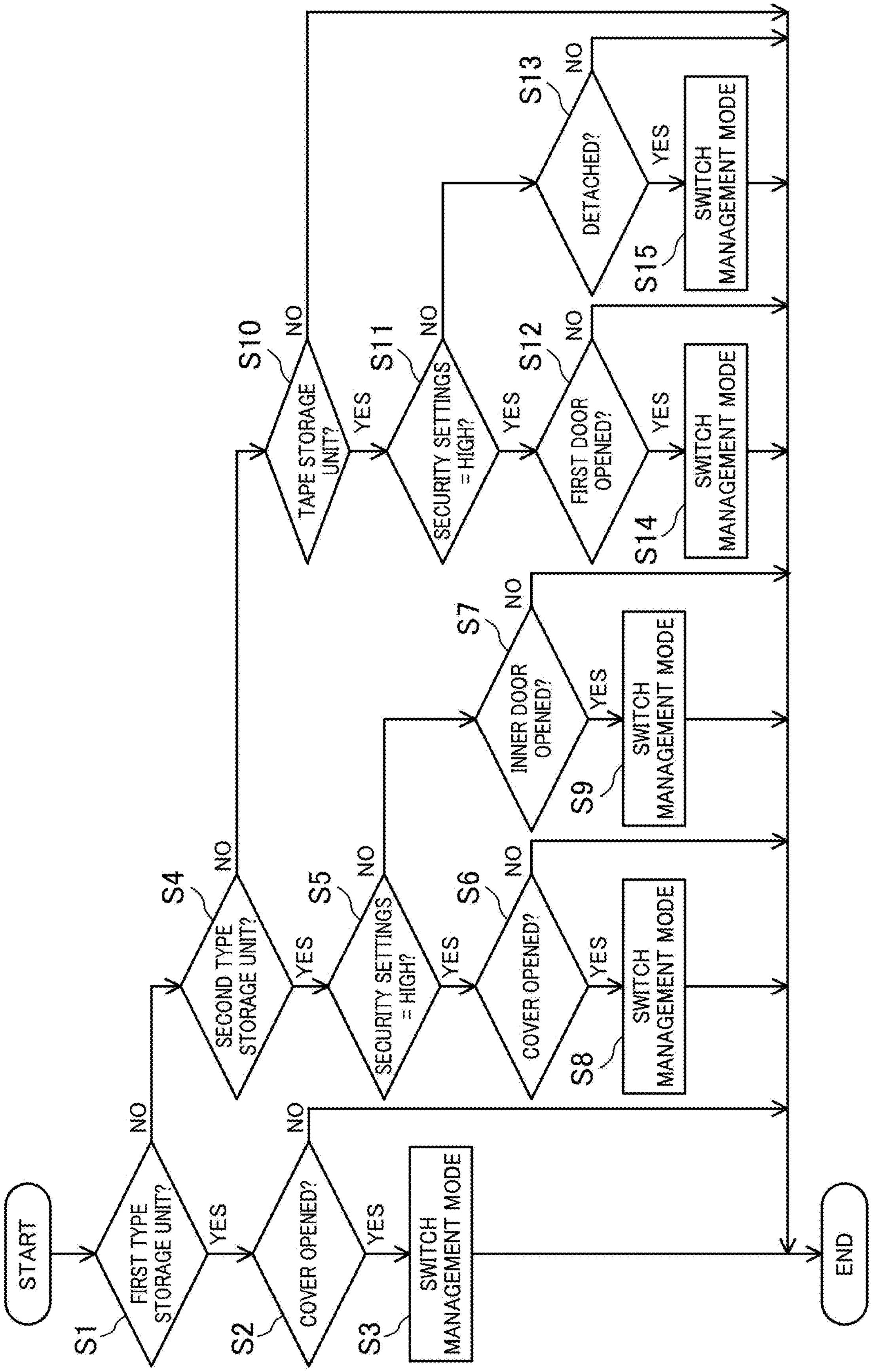
FIG. 7 is a flowchart of control procedures for switching of a management mode.

The flowchart of FIG. 7 shows control procedures for switching of the management mode by the control unit 15. For switching of the management mode, the control unit 15 recognizes the state of the first type stack storage units 31, the second type stack storage unit 32, and the tape storage units 34, and determines whether it is necessary to switch the mode. Specifically, the control unit 15 recognizes these storage units one by one and determines for each storage unit whether it is necessary to switch the mode.

First, the control unit 15 determines in step S1 whether the storage unit being recognized is the first type stack storage unit 31. When YES in step S1, the process proceeds to step S2. When NO in step S1, the process proceeds to step S4.

In step S2, the control unit 15 determines whether the cover 312 of the first type stack storage unit 31 is opened. When the cover 312 is opened, the process proceeds to step S3. The control unit 15 switches the management mode of the first type stack storage unit 31 from the serial number management mode to the quantity management mode. That is, the control unit 15 switches management of the banknotes stored in the first type stack storage unit 31 from management based on the serial numbers to management based on the numbers of banknotes fed into and out of the storage unit. The management mode is switched only for the storage unit whose cover 312 is opened. The process ends when the cover 312 is not opened in step S2. In this case, the control unit 15 maintains the serial number management mode for the first type stack storage unit 31.

In step S4, the control unit 4 determines whether the storage unit being recognized is the second type stack storage unit 32. When YES in step S4, the process proceeds to step S5. When NO in step S4, the process proceeds to step S10.

In step S5, the control unit 15 determines whether security settings of the banknote handling device 1 are "High." When YES instep S5, the process proceeds to step S6. When NO in step S5, the process proceeds to step S7. The user can select "High" or "Low" for the security settings as appropriate.

In step S6, the control unit 15 determines whether the cover 325 of the second type stack storage unit 32 is opened. When the cover 325 is opened, the process proceeds to step S8. The control unit 15 switches the management mode of the second type stack storage unit 32 from the serial number management mode to the quantity management mode. When the security settings are "High," the control unit 15 determines that the user can touch the banknotes and switches the management mode of the second type stack storage unit 32 by merely detecting opening of the cover 325 of the second type stack storage unit 32. The management mode is switched for both the upper storage unit 321 and the lower storage unit 322 of the second type stack storage unit 32. The process ends when the cover 325 is not opened in step S6. In this case, the control unit 15 maintains the serial number management mode for the second type stack storage unit 32.

In step S7, the control unit 15 determines whether the inner doors 326, 327 of the second type stack storage unit 32 are opened. When either or both of the inner doors 326, 327 are opened, the process proceeds to step S9. The control unit 15 switches the management mode of whichever storage unit 321, 322 whose inner door 326, 327 is opened from the serial number management mode to the quantity management mode. The process ends when the inner doors 326, 327 are not opened in step S7. In this case, the control unit 15 maintains the serial number management mode for the second type stack storage unit 32.

That is, for the second type stack storage unit 32, mode switch control from the serial number management mode to the quantity management mode is performed based on whether the cover 325 is opened, when the security settings are "High." When the security settings are "Low." the mode switch control is performed based on whether the inner doors 326, 327 are opened.

In step S10, the control unit 15 determines whether the storage unit being recognized is the tape type stack storage unit 34. When YES in step S10, the process proceeds to step S11. The process ends when NO in step S10.

In step S11, the control unit 15 determines whether the security settings of the banknote handling device 1 are "High." When YES in step S11, the process proceeds to step S12. When NO in step S11, the process proceeds to step S13. The user can select "High" or "Low" for the security settings as appropriate.

In step S12, the control unit 15 determines whether the first door 131 of the safe-housing 13 is opened. When the first door 131 is opened, the process proceeds to step S14. The control unit 15 switches the management mode of both of the two tape storage units 34 from the serial number management mode to the quantity management mode. When the security settings are "High," the control unit 15 determines that the user can touch the banknotes and switches the management mode of the tape storage unit 34 by merely detecting opening of opening of the first door 131. The process ends when the first door 131 is not opened in step S12. In this case, the control unit 15 maintains the serial number management mode for both of the two tape storage units 34.

In step S13, the control unit 15 determines whether the tape storage unit 34 has been detached from the support unit 30. When the tape storage unit 34 has been detached, the process proceeds to step S15. The control unit 15 switches the management mode of the detached tape storage unit 34 from the serial number management mode to the quantity management mode. The process ends when the tape storage unit 34 has not been detached. In this case, the control unit 15 maintains the serial number management mode for the tape storage unit 34.

That is, for the tape storage units 34, mode switch control from the serial number management mode to the quantity management mode is performed based on whether the first door 131 is opened, when the security settings am "High." When the security settings are "Low," the mode switch control is performed based on whether the tape storage unit 34 has been removed.

In the banknote handling device 1, the condition for switching the management mode from the serial number management mode to the quantity management mode is different for each storage unit. The banknote handling device 1 can thus maintain the serial number management mode as much as possible for each storage unit. This can avoid the functions of the banknote handling device 1 being unnecessarily limited. At the same time, the banknotes stored in the storage units 31, 32, 33, and 34 can be appropriately managed.

When any of the storage units is in the quantity management mode, the control unit 15 may send a notification that the storage unit is in the quantity management mode together with information identifying the storage unit to the user via, for example, the UI unit 16. This allows the user to identify the storage unit that is in the quantity management mode.

When the storage unit is in the quantity management mode, the control unit 15 manages the number of banknotes stored therein. When the control unit 15 checks the serial numbers of the banknotes stored in the storage unit that is in the quantity management mode, the control unit 15 switches the management mode of that storage unit from the quantity management mode to the serial number management mode. The control unit 15 can check serial numbers of the banknotes by performing a reconciliation process on the storage unit. In the reconciliation process, all the banknotes stored in the storage unit are fed out of the storage unit to check the number of banknotes and their serial numbers. When the storage unit is in the quantity management mode, the control unit 15 may send a notification to the user via the UI unit 16 to prompt the user to perform the reconciliation process on the storage unit. The control unit 15 can thus prompt the user to switch the management mode from the quantity management mode to the serial number management mode.

When the control unit 15 acquires information on the number of banknotes in the quantity management mode, the control unit 15 acquires the information on the number of banknotes based on information from the sensors in the banknote handling device 1. For example, the sensors provided for the storage units 31, 32, and 34, the sensors provided in the transport path, or the recognition unit 23 can be used to acquire the information on the number of banknotes in the quantity management mode.

(Another Example of Management Mode Switching: Switching Between Reconciliation Required Mode and No Reconciliation Required Mode)

In the above example, the management mode is switched from the serial management mode in which banknotes are managed based on the serial numbers to the quantity management mode in which banknotes are managed based on the number of banknotes, based on, for example, whether the storage unit is open or closed. Alternatively, whether the reconciliation process is to be performed may be determined based on, for example, whether the storage unit is open or closed. In this case, the first mode is a no reconciliation required mode, and the second mode is a reconciliation required mode. The control unit 15 determines in each of the serial number management mode and the quantity management mode whether reconciliation is required.

Specifically, the condition under which reconciliation is required for the first type stack storage unit 31 is that the cover 312 is opened. That is, when the control unit 15 detects opening of the cover 312 of the first type stack storage unit 31 based on the sensor signal, the control unit 15 determines that reconciliation is required for the first type stack storage unit 31. Namely, the control unit 15 switches the management mode of the first type stack storage unit 31 from the no reconciliation required mode to the reconciliation required mode based on opening of the cover 312 of the first type stack storage unit 31. The control unit 15 may switch the management mode to the reconciliation required mode only for the storage unit whose cover 312 is opened and may maintain the no reconciliation required mode for the storage unit whose cover 312 is not opened. Once the management mode is switched to the reconciliation required mode, that storage unit cannot be used until the reconciliation process is performed. The control unit 15 can appropriately manage the banknotes stored in the first type stack storage units 31 while avoiding the use of the storage units being unnecessarily limited.

The condition under which reconciliation is required for the second type stack storage unit 32 is that the inner doors 326, 327 are opened. That is, when the control unit 15 detects opening of the inner doors 326, 327 of the second type stack storage unit 32 based on the sensor signals, the control unit 15 determines that reconciliation is required for the second type stack storage unit 32. The control unit 15 switches the management mode of the second type stack storage unit 32 from the no reconciliation required mode to the reconciliation required mode. The control unit 15 switches the management mode to the reconciliation required mode only for the storage unit whose inner door 326, 327 is opened out of the upper storage unit 321 and the lower storage unit 322, and maintains the no reconciliation required mode for the storage unit whose inner door 326, 327 is not opened. The control unit IS can thus appropriately manage the banknotes stored in the upper storage unit 321 and the lower storage unit 322 while avoiding the use of the storage unit being unnecessarily limited. Alternatively, the control unit 15 may switch the management mode of both of the upper storage unit 321 and the lower storage unit 322 to the reconciliation required mode when one of the inner doors 326, 327 is opened. The control unit 15 can thus more strictly manage the banknotes stored in the second type stack storage unit 32.

Alternatively, the control unit 15 may switch the management mode of both of the upper storage unit 321 and the lower storage unit 322 from the no reconciliation required mode to the reconciliation required mode when the control unit 15 detects opening of the cover 325 of the second type stack storage unit 32 based on the sensor signal. The control unit 15 can thus more strictly manage the banknotes stored in the second type stack storage unit 32.

The condition under which reconciliation is required for the tape storage unit 34 is that the first door 131 is opened. When the control unit 15 detects opening of the first door 131 based on the sensor signal, the control unit 15 switches the management mode of the tape storage unit 34 from the no reconciliation required mode to the reconciliation required mode.

Alternatively, the control unit 15 may switch the management mode of the tape storage unit 34 from the no reconciliation required mode to the reconciliation required mode when the control unit 15 detects detachment of the tape storage unit 34 from the support unit 30 based on the sensor signal. In this case, the control unit 15 may switch the management mode from the no reconciliation required mode to the reconciliation required mode only for the tape storage unit 34 detached from the support unit 30 out of the two tape storage units 34. The control unit 15 can thus avoid the functions of the banknote handling device 1 being unnecessarily limited. The control unit 15 can also appropriately manage the banknotes stored in the tape storage units 34. The control unit IS may switch the management mode of both of the two tape storage units 34 from the no reconciliation required mode to the reconciliation required mode when one of the two tape storage units 34 is detached.

In the above configuration, the condition for switching the management mode varies depending on the storage method of the storage unit. For example, in the banknote handling device 1 including a first storage unit undetachably fixed to the banknote handling device 1 and a second storage unit detachably fixed to the banknote handling device 1, the condition for switching the management mode may vary depending on the attachment structure of the storage unit.

(Banknote Management Based on Serial Numbers)

Next, characteristics of the serial number management mode other than those described above will be described. Specifically, in the serial number management mode, the number of banknotes to be fed out of the storage unit in order to confirm the number of banknotes can be set to a desired value according to the condition. The number of banknotes to be fed out of the storage unit in order to confirm the number of banknotes can be set according to, for example, the type of storage unit (stack storage unit, tape storage unit). Alternatively, the number of banknotes to be fed out of the storage unit in order to confirm the number of banknotes can be set according to, for example, a defective operation of the banknote handling device. The defective operation of the banknote handling device herein refers to rejection during a withdrawal process or an error. The error herein refers to, for example, a jam.

When the control unit 15 manages banknotes in the serial number management mode, the memory 18 stores a list of serial numbers corresponding to the order of the banknotes stored in the storage unit. In this list, each serial number is associated with the inventory amount of the storage unit. Accordingly, as described above, the control unit 15 can confirm the number of banknotes remaining in the storage unit when the storage unit feeds out at least one banknote and the recognition unit 23 reads its serial number and matches the serial number against the list. That is, the control unit 15 can check the inventory amount of the storage unit without feeding all of the banknotes out of the storage unit.

By using this function, even when banknotes fed out of the storage unit overlap each other and an unknown number of banknotes are rejected during, for example, a withdrawal process, the inventory amount of the storage unit can be confirmed by causing the storage unit to feed out its stored banknote(s) and the recognition unit 23 to read its serial number(s) after the withdrawal process. This process is called a partial reconciliation process as it is a process of checking the inventory amount of the storage unit by feeding only a part of the stored banknotes out of the storage unit. The partial reconciliation process can be performed on each of the stack storage units and the tape storage units.

In the stack storage unit, however, the order of banknotes may change when a plurality of banknotes are successively stored. When the order of banknotes changes, the order in the list stored in the memory 18 does not match the actual storage order in the storage unit. Therefore, even when the storage unit feeds out one banknote and the recognition unit 23 reads its serial number during the partial reconciliation process, the inventory amount of the storage unit cannot be accurately confirmed if the storage order of banknotes is shifted.

Accordingly, the control unit 15 matches a group of the last plurality of banknotes fed out of the storage unit against the list stored in the memory 18 during the partial reconciliation process. For example, the number of banknotes in the group may be five. This is because even if the storage order of banknotes is shifted, it will basically not be shifted by five or more banknotes. How the control unit 15 matches the serial numbers against the list will be described with reference to FIG. 8.

Figure 8:
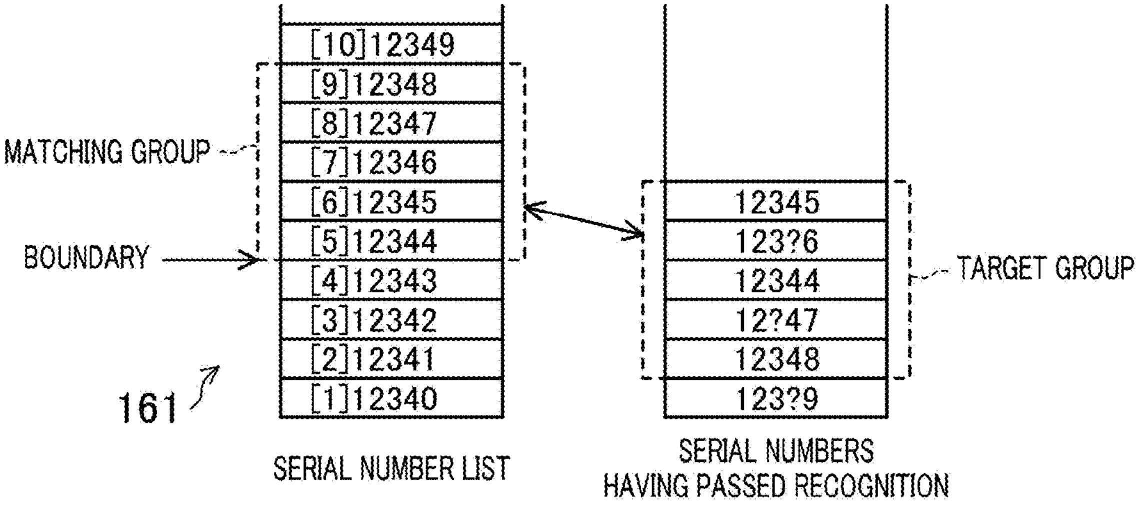
FIG. 8 illustrates matching of serial numbers in a serial number management mode.

The left part of FIG. 8 shows a serial number list 161 stored in the memory 18. "12340" etc. in the serial number list 161 is a serial number. The upper side of the serial number list 161 indicates the top of the order of banknotes. The numerals in square brackets are serial numbers in the list, and corresponds to the number of banknotes stored in the storage unit, namely the inventory amount of the storage unit.

The right part of FIG. 8 shows the serial numbers of the banknotes fed out of the storage unit and read by the recognition units 23. The serial number of the first banknote fed out of the storage unit is shown at the bottom, and the serial number of the last banknote fed out of the storage unit is shown at the top. The recognition unit 23 may not be able to read all digits of the serial number of each banknote.

When the recognition unit 23 was not able to read a predetermined number or more of digits of the serial number, the storage unit feeds out an additional banknote as a substitute. For example, when the recognition unit 23 was not able to read the third banknote out of five banknotes fed out of the storage unit, the storage unit feeds out three additional banknotes. The recognition unit 23 reads the serial numbers of five consecutive banknotes including the fourth and fifth banknotes and the three additional banknotes. If any of the banknotes is rejected while the recognition unit 23 is reading the serial numbers, the storage unit feeds out five additional banknotes. A target group of serial numbers of five banknotes, which is to be matched against the serial number list 161, is thus determined.

Once the control unit 15 determines the target group, the control unit 15 matches the target group against the serial number list 161. The control unit 15 thus identifies a group corresponding to the target group, namely a matching group, in the serial number list 161. The serial numbers of the target group may be matched with the serial number list 161 in any order.

Since the target group corresponds to the banknotes fed out of the storage unit, the identified matching group indicates the boundary between the banknotes fed out of the storage unit and the banknotes remaining in the storage unit in the serial number list 161. By identifying the matching group in the serial number list 161, the control unit 15 can confirm the banknotes remaining in the storage unit. That is, the control unit 15 can check the inventory amount of the storage unit.

The transport unit 4 may transport the banknotes fed out of the storage unit in the partial reconciliation process to the temporary storage unit 38, as only a small number of banknotes are fed out of the storage unit in the partial reconciliation process.

The control unit 15 performs the partial reconciliation process when any banknote is rejected during a withdrawal process in the serial number management mode. The control unit 15 performs the partial reconstruction process only on the storage unit that fed out the reject note.

When the control unit 15 performs the partial reconciliation process on the stack storage unit 31 or 32, the control unit 15 sets a target group of serial numbers of five banknotes as described above. Unlike in the stack storage units 31, 32, the order of banknotes hardly changes when banknotes are stored in the tape storage units 34. Accordingly, when the control unit 15 performs the partial reconciliation process on the tape storage unit 34, the control unit 15 sets a target group of serial numbers of two banknotes. The control unit 15 can thus easily set a target group and accurately check the inventory amount of the tape storage unit 34.

When an error (e.g., a jam) occurs during, for example, the deposit process in the serial number management mode, the control unit 15 also performs the partial reconciliation process after the error is eliminated. The control unit 15 performs the partial reconciliation process only on the storage unit related to the error.

When the control unit 15 performs the partial reconciliation process on the stack storage unit 31 or 32 after the error is eliminated, the control unit 15 sets a target group of serial numbers of five banknotes as described above. When the control unit 15 performs the partial reconciliation process on the tape storage unit 34 after the error is eliminated, the control unit 15 sets a target group of serial numbers of five banknotes unlike in the case described above. When an error occurs, banknotes may collide on the transport path or a banknote may pass another banknote on the transport path unlike in a normal state. The storage order of banknotes therefore may change even in the tape storage unit 34. Accordingly, when performing the partial reconciliation process after an error is eliminated, the control unit 15 sets a target group of serial numbers of five banknotes regardless of whether the storage unit is the stack storage unit 31, 32 or the tape storage unit 34.

(Reconciliation Process in Quantity Management Mode)

Next, characteristics of the quantity management mode other than those described above will be described. Specifically, in the quantity management mode, for which storage unit the number of stored banknotes should be confirmed can be set according to the condition in order to confirm the number of banknotes. For example, in the banknote handling device 1 including both a stack storage unit and a tape storage unit, a process of preferentially checking the number of banknotes stored in the tape storage unit over the number of banknotes stored in the stack storage unit can be performed when it is necessary to confirm both the number of banknotes stored in the stack storage unit and the number of banknotes stored in the tape storage unit. When there is a plurality of storage units of the same type (for example, when there are two tape storage units in the example of FIG. 9), a process of preferentially checking only the number of banknotes stored in the storage unit for which the number of stored banknotes needs to be confirmed) can be performed.

When an error occurs during processing in the banknote handling device 1, the control unit 15 performs the reconciliation process on the storage unit related to the error. The error is a banknote jam near the inlet or outlet of the storage unit. When a banknote jam occurs near the inlet or outlet, the number of banknotes actually stored in the storage unit may not match the number of banknotes that are managed based on the detection signals from the sensors that detect passage of banknotes at the inlet and outlet.

The reconciliation process is a process of checking the inventory amount of the storage unit. As described above, in the serial number management mode based on serial numbers, the inventory amount can be confirmed by merely feeding a part of stored banknotes from the storage unit. In the quantity management mode, however, the inventory amount cannot be confirmed unless all the stored banknotes are fed out of the storage unit. It therefore takes a long time to perform the reconciliation process. The banknote handling device 1 cannot be used during the reconciliation process. Namely, the use and functions of the banknote handling device 1 are limited.

For example, when a plurality of banknotes overlaps each other, namely multiple feeding occurs, during a withdrawal process from the stack storage unit 31, reject notes related to the multiple feeding are stored in a reject storage unit, specifically the upper storage unit 321, and the stack storage unit 31 feeds out its stored banknotes again. The number of banknotes to be withdrawn is thus accumulated in the dispense unit 22.

In the quantity management mode, the control unit 15 manages the number of banknotes based on the number of banknotes fed into the storage unit and the number of banknotes fed out of the storage unit. However, when multiple feeding occurs, the number of banknotes fed out of the storage unit becomes uncertain. Since the number of banknotes dispensed to the dispense unit 22 is confirmed, the total number of banknotes stored in the banknote handling device 1, specifically the total number of banknotes stored in the stack storage unit 31 and the reject storage unit 321, can be confirmed. Accordingly, when any of the banknotes is rejected in the quantity management mode, the control unit 15 will not manage the number of banknotes stored in each stack storage unit 31 but manage the total of the number of banknotes stored in the plurality of stack storage units 31 and the number of banknotes stored in the reject storage unit 321.

Accordingly, when such a reconciliation process as described above is required for the stack storage unit 31 due to an error that occurs in the quantity management mode, the reconciliation process needs to be performed on all the stack storage units 31 and the reject storage unit 321. Since the stack storage units 31 have a large storage capacity, it will take a significantly long time to perform the reconciliation process on all the stack storage units 31 and the reject storage unit 321. As described above, the banknote handling device 1 cannot be used during the reconciliation process. This is disadvantageous as it will interrupt the business operations for a long time.

Unlike in the stack storage unit 31, multiple feeding basically does not occur in the tape storage unit 34 due to its structure. Accordingly, even in the quantity management mode, the control unit 15 can manage for each tape storage unit 34 the number of banknotes stored in the tape storage unit 34. Even when the reconciliation process is required for the tape storage unit 34 due to an error that occurs in the quantity management mode, the control unit 15 can control the number of banknotes by performing the reconciliation process only on the tape storage unit 34 related to the error. Since the tape storage units 34 have a small storage capacity, it takes only a short time to perform the reconciliation process on one or both of the tape storage units 34.

The banknote handling device 1 includes the two types of storage units, the stack storage units 31 and the tape storage units 34. As the control unit 15 uses these two types of storage units according to the situation, the convenience of the banknote handling device 1 can be improved.

The above control example will be specifically described with reference to FIG. 9. FIG. 9 illustrates changes in numbers of banknotes stored in the first and second tape storage units 34, the first and second stack storage units 31, and the reject storage unit 321 of the banknote handling device 1. In FIG. 9 "counter" indicates the number of banknotes managed by the control unit 15 based on the detection signals from the sensors mounted at the inlet and outlet of each storage unit, and "actual" indicates the number of banknotes actually stored in each storage unit.

In FIG. 9, P91 indicates the number of banknotes stored in each storage unit in the initial state. Each of the first and second tape storage units 34 stores 100 banknotes, and the number of banknotes managed by the control unit 15 matches the actual number of banknotes. The first and second stack storage units 31 store 199 banknotes and 202 banknotes, respectively. However, the number of banknotes managed by the control unit 15 is 200 for the first stack storage unit 31 and 200 for the second stack storage unit 31. Although the reject storage unit 321 stores 49 banknotes, the number of banknotes managed by the control unit 15 is 50 for the reject storage unit 321. As for the total number of banknotes stored in the first stack storage unit 31, the second stack storage unit 31, and the reject storage unit 321, the number of banknotes managed by the control unit 15 and the actual number of banknotes are both 450.

P92 indicates the number of banknotes stored in each storage unit when the banknote handling device is stopped due to an error that occurred during a deposit process. Banknotes are stored in each of the first tape storage unit 34 and the first stack storage unit 31 during the deposit process. However, due to the error, the number of banknotes (210) managed by the control unit 15 for the first stack storage unit 31 does not match the number of banknotes (211) actually stored in the first stack storage unit 31. The number of banknotes (110) managed by the control unit 15 for the first tape storage unit 34 does not match the number of banknotes (109) actually stored in the first tape storage unit 34, either. Although the number of actually deposited banknotes is 21, the number of deposited banknotes managed by the control unit 15 is 20.

Due to the error, it is necessary to perform the reconciliation process on the first tape storage unit 34 and the first stack storage unit 31 that are related to the error. When performing the reconciliation process on the first stack storage unit 31, the control unit 15 also need to perform the reconciliation process on the second stack storage unit 31 and the reject storage unit 321.

As described above, it will take a long time to perform the reconciliation process on all of the first stack storage unit 31, the second stack storage unit 31, and the reject storage unit 321. Accordingly, the banknote handling device 1 performs the reconciliation process only on the first tape storage unit 34 that can be reconciliated in a relatively short time. Specifically, when there are, for example, two tape storage units (first tape storage unit 34 and second tape storage unit 34), there is a case where no banknotes were stored in the second tape storage unit 34 during a deposit process and the number of banknotes managed by the control unit 15 for the second tape storage unit 34 matches the number of banknotes actually stored in 23 the second tape storage unit 34, but a banknote(s) was stored in the first tape storage unit 34 during the deposit process and the number of banknotes managed by the control unit 15 for the first tape storage unit 34 may not match the number of banknotes actually stored in the first tape storage unit 34. In this case, the control unit 15 does not perform the reconciliation process on the second tape storage unit 34, but performs the reconciliation process only on the first tape storage unit 34. The reconciliation process can be performed on the first tape storage unit 34 by using the temporary storage unit 38. The control unit 15 allows the use of the first tape storage unit 34 after performing the reconciliation process on the first tape storage unit 34. The control unit 15 continuously permits the use of the second tape storage unit 34 that is not to be subjected to the reconciliation process. The control unit 15 skips the reconciliation process for the first stack storage unit 31, the second stack storage unit 31, and the reject storage unit 321.

P93 indicates the number of banknotes stored in each storage unit when the reconciliation process is completed for the first tape storage unit 34. As a result of the reconciliation process, the number of banknotes managed by the control unit 15 for the first tape storage unit 34 matches the number of banknotes actually stored in the first tape storage unit 34, which is 109.

After completing the reconciliation process for the first tape storage unit 34, the control unit 15 performs the various processes of the banknote handling device 1 using only the first and second tape storage units 34. The banknote handling device 1 stopped due to the error can thus be quickly restored. Unnecessary limitation on the banknote handling device 1 is thus reduced.

The control unit 15 prohibits the use of the first stack storage unit 31, the second stack storage unit 31, and the reject storage unit 321 that have not been reconciliated. In P93, since the reconciliation process has not been performed on the first stack storage unit 31, the number of banknotes managed by the control unit 15 for the first stack storage unit 31 still does not match the number of banknotes actually stored in the first stack storage unit 31.

For example, the reconciliation process for the first stack storage unit 31, the second stack storage unit 31, and the reject storage unit 321 may be performed after the close of business at an office of a financial institution where the banknote handling device 1 is installed. This reduces the influence on the business operations of the office.

P94 indicates the number of banknotes stored in each storage unit when the reconciliation process is completed for the first stack storage unit 31, the second stack storage unit 31, and the reject storage unit 321. As a result of the reconciliation process, the numbers of banknotes managed by the control unit 15 for the first stack storage unit 31 and the second stack storage unit 31 match the numbers of banknotes actually stored in the first stack storage unit 31 and the second stack storage unit 31, respectively. The number of banknotes managed for the reject storage unit 321 also matches the number of banknotes actually stored in the reject storage unit 321, and the number of deposited banknotes can be confirmed.

The control unit 15 allows the use of the first stack storage unit 31, the second stack storage unit 31, and the reject storage unit 321 after completing the reconciliation process for the first stack storage unit 31, the second stack storage unit 31, and the reject storage unit 321.

As described above, the banknote handling device 1 including the stack storage units 31 and the tape storage units 34 can continue the processes using only the tape storage units 34 even when the use of the stack storage units 31 is prohibited after an error occurs. It is preferable that the tape storage units 34 store a plurality of denominations of banknotes.

The technique disclosed herein is not limited to applications to the above banknote handling device 1. The technique disclosed herein is applicable to sheet handling devices that handle sheets including vouchers, stock certificates, and other valuable media.

What is claimed is:

1. A sheet handling device that handles a sheet that is a banknote, the sheet handling device comprising:

a storage including a first storage that stores the sheet, and a second storage that stores the sheet in a different storage manner from the first storage;

a transporter that transports the sheet inside the sheet handling device;

a detection sensor that is located in the transporter and that detects an image, a serial number, and a denomination of the sheet being transported;

a housing that houses the first storage and the second storage and that includes: a door that exposes inside of the housing; and a door sensor that detects movement of the door; and processing circuitry that manages the sheet stored in the first storage and the second storage, wherein the first storage includes an opening that exposes a storage area for the sheet;

a cover that covers the storage area by covering the opening; and a cover sensor that detects movement of the cover, and the first storage is a stack container that stores the sheet by stacking the sheet in a vertical direction with a face or back of the sheet facing downward or by arranging the sheet in a horizontal direction with the face or back of the sheet facing horizontally, the second storage is a tape storage that stores the sheet by winding the sheet together with a tape around a drum, in a case where the processing circuitry determines that the cover of the first storage has moved based on the detection by the cover sensor, and thereby determines that the sheet handling device satisfies a first condition that the storage area of the first storage is exposed, the processing circuitry switches a mode from a first mode to a second mode to manage the sheet related to the first storage, and in a case where the processing circuitry determines that the door of the housing has moved based on the detection by the door sensor, and thereby determines that the sheet handling device satisfies a second condition that the inside of the housing is exposed, the processing circuitry switches the mode from the first mode to the second mode to manage the sheet related to the second storage.

2. The sheet handling device of claim 1, wherein the first mode is a mode in which the processing circuitry manages a number of sheets stored in the storage based on the serial number acquired by the detection sensor, and the second mode is a mode in which the processing circuitry manages the number of sheets stored in the storage based on a number of sheets fed into the storage and a number of sheets fed out of the storage.

3. The sheet handling device of claim 1, wherein the processing circuitry performs a reconciliation process of checking a number of sheets stored in the storage based on a detection result of the sheet fed out of the storage from the detection sensor, the first mode is a mode in which the reconciliation process is not required, and the second mode is a mode in which the reconciliation process is required, and the processing circuitry allows use of the storage in the first mode, and in the second mode, the processing circuitry prohibits the use of the storage and allows the use of the storage after performing the reconciliation process.

4. The sheet handling device of claim 1, wherein the first storage includes one storage area for the sheet, and the second storage includes a plurality of storage areas for the sheet, the storage areas being independent of each other.

5. The sheet handling device of claim 1, wherein the first storage and the second storage are detachable from the sheet handling device, and the second condition is that the second storage is detached from the sheet handling device.

6. The sheet handling device of claim 2, wherein in the second mode, the processing circuitry switches the mode from the second mode to the first mode after performing a reconciliation process of checking the serial number of the sheet stored in the storage and the number of sheets stored in the storage by causing the storage to feed out the sheet and causing the detection sensor to acquire the serial number of the sheet fed out of the storage.

7. The sheet handling device of claim 2, further comprising:

an interface that performs a notification to a user, wherein in the second mode, the processing circuitry controls the interface to notify the user that the mode is the second mode.

8. The sheet handling device of claim 6, further comprising:

an interface that performs a notification to a user, wherein the processing circuitry controls the interface to perform a notification to the user to prompt the user to perform the reconciliation process.

9. The sheet handling device of claim 3, wherein the storage includes a plurality of the first storages, and in a case that the processing circuitry manages the sheet related to the first storage in the second mode, the processing circuitry allows use of the plurality of first storages after performing the reconciliation process on all the first storages.

10. The sheet handling device of claim 3, wherein the storage includes a plurality of the second storages, and in a case that the processing circuitry manages the sheet related to the second storage in the second mode, the processing circuitry allows use of the second storage that satisfies the second condition after performing the reconciliation process on that second storage, and permits use of the second storage that does not satisfy the second condition.

* * * * *